United States Patent [19]

Porter et al.

[11] Patent Number: 4,484,276
[45] Date of Patent: Nov. 20, 1984

[54] SHIFT MATRIX PRESELECTOR CONTROL CIRCUIT

[75] Inventors: John R. Porter, Eagan; Melvin A. Wagner, Burnsville, both of Minn.

[73] Assignee: Sperry Corporation, New York, N.Y.

[21] Appl. No.: 509,096

[22] Filed: Jun. 28, 1983

Related U.S. Application Data

[63] Continuation of Ser. No. 235,864, Feb. 19, 1981, abandoned.

[51] Int. Cl.[3] .......................... G06F 9/24; G06F 9/26; G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,371,320 | 2/1968 | Lachenmayer | 364/900 |
| 3,436,737 | 4/1969 | Iverson | 364/900 |
| 3,610,903 | 10/1971 | Stokes | 364/900 X |
| 3,887,799 | 6/1975 | Lindgren | 364/900 X |
| 3,997,771 | 12/1976 | Perlowski | 364/900 X |
| 4,023,023 | 5/1977 | Bourrez et al. | 364/200 |
| 4,128,872 | 12/1978 | Prioste | 364/900 |
| 4,161,784 | 7/1979 | Cushing | 364/200 X |
| 4,195,200 | 3/1980 | Feistel | 364/900 X |
| 4,338,675 | 7/1982 | Palmer et al. | 364/748 |

Primary Examiner—James D. Thomas
Assistant Examiner—A. E. Williams, Jr.
Attorney, Agent, or Firm—William C. Fuess; Kenneth T. Grace; Marshall M. Truex

[57] ABSTRACT

A computer digital logic circuit utilizing an encoded Read Only Memory (ROM) and multiplexor elements is used to translate top-level shift control signals, such as arise from instruction translation, into the low-level control of selecting data input to, and controlling the shift count in, a shif matrix during a generalized computer shift operation. ROM size is held to only 64 addresses × 16 bits per addressed cell in controlling selectable circular, selectable sign fill, single precision or double precision (dual pass) shifting in a sixteen bit shift matrix because the ROM is addressed with only part of the top-level shift control signals. Remaining top-level signals select among encoded outputs of the ROM in four multiplexor circuit elements to produce low-level gating control signals, called preselector control, which ultimately enable selection among two registers' data and sign fill data inputs to the shift matrix. The ROM directly produces the shift count control of the shift matrix. The combination of selection control and shift count control produced enables management of a shift matrix during general versatile shift operations, including double precision shifting.

9 Claims, 11 Drawing Figures

| SHIFT MATRIX CONTROL READ ONLY MEMORY TABLE ||||
|---|---|---|---|
| ADDRESS | CONTENTS |||
| INPUT ADDRESS BITS | OUTPUT SHIFT MATRIX CONTROL ROM BITS |||
| 5 4 3 2 1 0 | 15 14 13 12 11 10 | 9 8 7 6 5 4 | 3 2 1 0 |
| 0 0 0 0 0 0 | 0 1 0 0 0 0 | 0 0 0 1 0 0 | 0 0 0 0 |
| 0 0 0 0 0 1 | 0 0 1 1 1 0 | 0 1 0 0 0 0 | 1 1 1 1 |
| 0 0 0 0 1 0 | 0 0 1 1 1 0 | 0 1 0 0 0 0 | 1 1 1 0 |
| 0 0 0 0 1 1 | 0 0 1 1 1 0 | 0 1 0 0 0 0 | 1 1 0 1 |
| 0 0 0 1 0 0 | 0 0 1 1 1 0 | 0 1 0 0 0 0 | 1 1 0 0 |
| 0 0 0 1 0 1 | 0 0 1 1 1 0 | 0 1 0 0 0 0 | 1 0 1 1 |
| 0 0 0 1 1 0 | 0 0 1 1 1 0 | 0 1 0 0 0 0 | 1 0 1 0 |
| 0 0 0 1 1 1 | 0 0 1 1 1 0 | 0 1 0 0 0 0 | 1 0 0 1 |
| 0 0 1 0 0 0 | 0 0 1 1 1 0 | 0 1 0 0 0 0 | 1 0 0 0 |
| 0 0 1 0 0 1 | 0 0 1 1 1 0 | 0 1 0 0 0 0 | 0 1 1 1 |
| 0 0 1 0 1 0 | 0 0 1 1 1 0 | 0 1 0 0 0 0 | 0 1 1 0 |
| 0 0 1 0 1 1 | 0 0 1 1 1 0 | 0 1 0 0 0 0 | 0 1 0 1 |
| 0 0 1 1 0 0 | 0 0 1 1 1 0 | 0 1 0 0 0 0 | 0 1 0 0 |
| 0 0 1 1 0 1 | 0 0 1 1 1 0 | 0 1 0 0 0 0 | 0 0 1 1 |
| 0 0 1 1 1 0 | 0 0 1 1 1 0 | 0 1 0 0 0 0 | 0 0 1 0 |
| 0 0 1 1 1 1 | 0 0 1 1 1 0 | 0 1 0 0 0 0 | 0 0 0 1 |
| 0 1 0 0 0 0 | 0 0 1 0 1 0 | 0 1 0 0 1 0 | 0 0 0 0 |
| 0 1 0 0 0 1 | 1 1 1 0 1 0 | 0 0 1 1 1 0 | 1 1 1 1 |
| 0 1 0 0 1 0 | 1 1 1 0 1 0 | 0 0 1 1 1 0 | 1 1 1 0 |
| 0 1 0 0 1 1 | 1 1 1 0 1 0 | 0 0 1 1 1 0 | 1 1 0 1 |
| 0 1 0 1 0 0 | 1 1 1 0 1 0 | 0 0 1 1 1 0 | 1 1 0 0 |
| 0 1 0 1 0 1 | 1 1 1 0 1 0 | 0 0 1 1 1 0 | 1 0 1 1 |
| 0 1 0 1 1 0 | 1 1 1 0 1 0 | 0 0 1 1 1 0 | 1 0 1 0 |
| 0 1 0 1 1 1 | 1 1 1 0 1 0 | 0 0 1 1 1 0 | 1 0 0 1 |
| 0 1 1 0 0 0 | 1 1 1 0 1 0 | 0 0 1 1 1 0 | 1 0 0 0 |
| 0 1 1 0 0 1 | 1 1 1 0 1 0 | 0 0 1 1 1 0 | 0 1 1 1 |
| 0 1 1 0 1 0 | 1 1 1 0 1 0 | 0 0 1 1 1 0 | 0 1 1 0 |
| 0 1 1 0 1 1 | 1 1 1 0 1 0 | 0 0 1 1 1 0 | 0 1 0 1 |
| 0 1 1 1 0 0 | 1 1 1 0 1 0 | 0 0 1 1 1 0 | 0 1 0 0 |
| 0 1 1 1 0 1 | 1 1 1 0 1 0 | 0 0 1 1 1 0 | 0 0 1 1 |
| 0 1 1 1 1 0 | 1 1 1 0 1 0 | 0 0 1 1 1 0 | 0 0 1 0 |
| 0 1 1 1 1 1 | 1 1 1 0 1 0 | 0 0 1 1 1 0 | 0 0 0 1 |

*Fig. 6a*

| SHIFT MATRIX CONTROL READ ONLY MEMORY TABLE ||
| ADDRESS | CONTENTS |
| INPUT ADDRESS BITS | OUTPUT SHIFT MATRIX CONTROL ROM BITS |
| 5 4 3 2 1 0 | 15 14 13 12 11 10    9 8 7 6 5 4    3 2 1 0 |
| 1 0 0 0 0 0 | 0 1 0 0 0 0    0 0 0 1 0 0    0 0 0 0 |
| 1 0 0 0 0 1 | 0 1 0 0 0 0    1 0 0 1 1 0    0 0 0 1 |
| 1 0 0 0 1 0 | 0 1 0 0 0 0    1 0 0 1 1 0    0 0 1 0 |
| 1 0 0 0 1 1 | 0 1 0 0 0 0    1 0 0 1 1 0    0 0 1 1 |
| 1 0 0 1 0 0 | 0 1 0 0 0 0    1 0 0 1 1 0    0 1 0 0 |
| 1 0 0 1 0 1 | 0 1 0 0 0 0    1 0 0 1 1 0    0 1 0 1 |
| 1 0 0 1 1 0 | 0 1 0 0 0 0    1 0 0 1 1 0    0 1 1 0 |
| 1 0 0 1 1 1 | 0 1 0 0 0 0    1 0 0 1 1 0    0 1 1 1 |
| 1 0 1 0 0 0 | 0 1 0 0 0 0    1 0 0 1 1 0    1 0 0 0 |
| 1 0 1 0 0 1 | 0 1 0 0 0 0    1 0 0 1 1 0    1 0 0 1 |
| 1 0 1 0 1 0 | 0 1 0 0 0 0    1 0 0 1 1 0    1 0 1 0 |
| 1 0 1 0 1 1 | 0 1 0 0 0 0    1 0 0 1 1 0    1 0 1 1 |
| 1 0 1 1 0 0 | 0 1 0 0 0 0    1 0 0 1 1 0    1 1 0 0 |
| 1 0 1 1 0 1 | 0 1 0 0 0 0    1 0 0 1 1 0    1 1 0 1 |
| 1 0 1 1 1 0 | 0 1 0 0 0 0    1 0 0 1 1 0    1 1 1 0 |
| 1 0 1 1 1 1 | 0 1 0 0 0 0    1 0 0 1 1 0    1 1 1 1 |
| 1 1 0 0 0 0 | 1 0 0 1 1 0    0 1 0 0 0 0    0 0 0 0 |
| 1 1 0 0 0 1 | 1 0 0 1 1 0    1 1 1 0 1 0    0 0 0 1 |
| 1 1 0 0 1 0 | 1 0 0 1 1 0    1 1 1 0 1 0    0 0 1 0 |
| 1 1 0 0 1 1 | 1 0 0 1 1 0    1 1 1 0 1 0    0 0 1 1 |
| 1 1 0 1 0 0 | 1 0 0 1 1 0    1 1 1 0 1 0    0 1 0 0 |
| 1 1 0 1 0 1 | 1 0 0 1 1 0    1 1 1 0 1 0    0 1 0 1 |
| 1 1 0 1 1 0 | 1 0 0 1 1 0    1 1 1 0 1 0    0 1 1 0 |
| 1 1 0 1 1 1 | 1 0 0 1 1 0    1 1 1 0 1 0    0 1 1 1 |
| 1 1 1 0 0 0 | 1 0 0 1 1 0    1 1 1 0 1 0    1 0 0 0 |
| 1 1 1 0 0 1 | 1 0 0 1 1 0    1 1 1 0 1 0    1 0 0 1 |
| 1 1 1 0 1 0 | 1 0 0 1 1 0    1 1 1 0 1 0    1 0 1 0 |
| 1 1 1 0 1 1 | 1 0 0 1 1 0    1 1 1 0 1 0    1 0 1 1 |
| 1 1 1 1 0 0 | 1 0 0 1 1 0    1 1 1 0 1 0    1 1 0 0 |
| 1 1 1 1 0 1 | 1 0 0 1 1 0    1 1 1 0 1 0    1 1 0 1 |
| 1 1 1 1 1 0 | 1 0 0 1 1 0    1 1 1 0 1 0    1 1 1 0 |
| 1 1 1 1 1 1 | 1 0 0 1 1 0    1 1 1 0 1 0    1 1 1 1 |

*Fig. 6b*

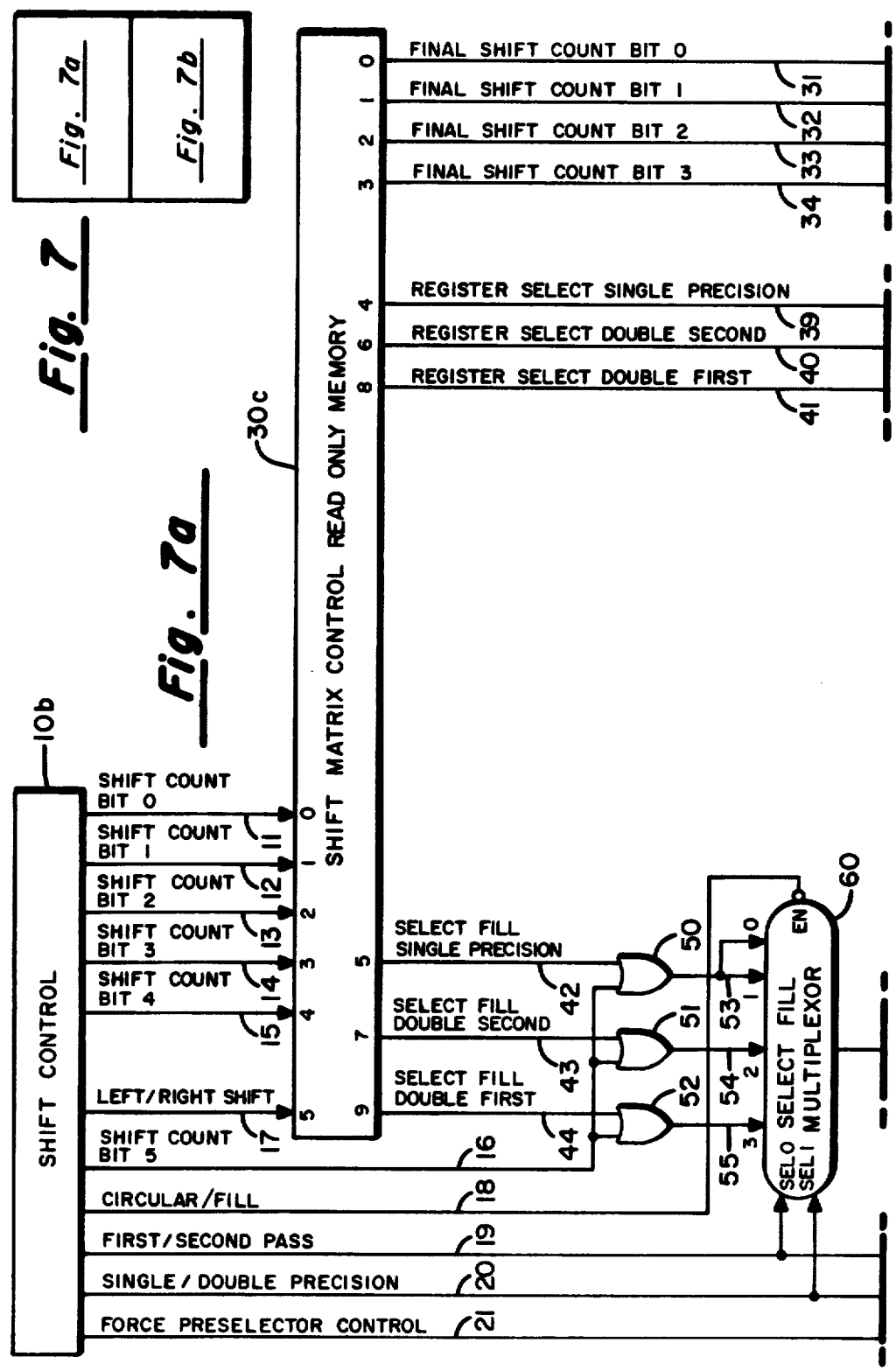

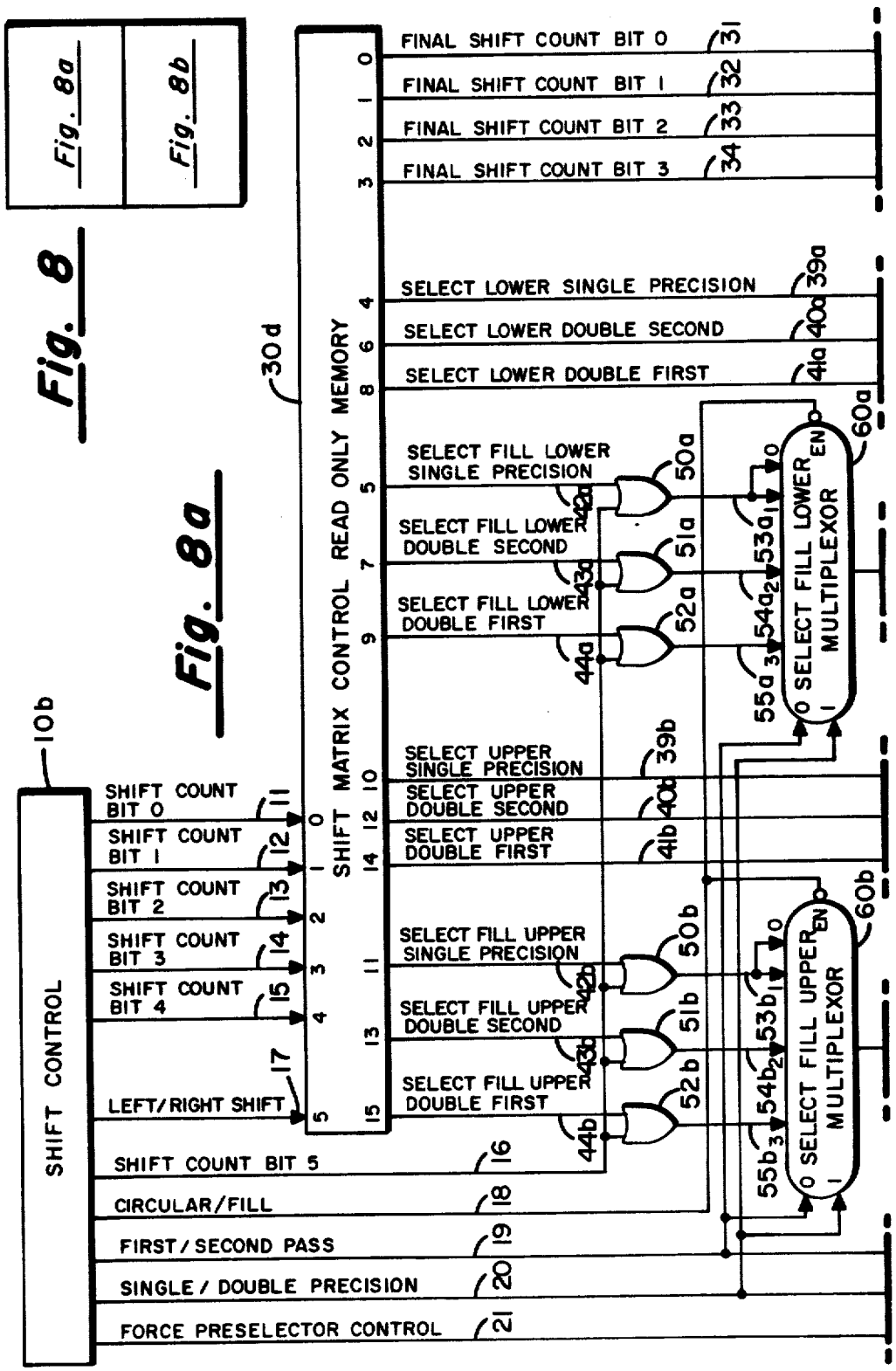

SHIFT MATRIX PRESELECTOR CONTROL CIRCUIT

This is a continuation of application Ser. No. 235,864 filed Feb. 19, 1981, now abandoned.

BACKGROUND OF THE INVENTION

In digital computer arithmetic units which perform shift instructions generally, and especially double precision shifting of two data words as are contained in two registers, it is necessary for control logics to act upon the top-level shift control signals as are normally derived from instruction translation or command directives in order to effectuate the detail low-level control of a shift matrix so as to accomplish the desired result. The types of top-level shift control signals which must ultimately effect control of the shift matrix include the shift count, whether a shift is left or right, whether a circular (recirculating) shift is desired, whether shifted bit positions should be zero filled or sign filled, and whether it is the first or second pass of a double precision shift. The low-level control of the shift matrix is defined as the control of the selection of data input to the shift matrix plus the control of the amount of shifting, or shift count, to be performed on the selected data as it passes through the shift matrix.

This low-level control of the shift matrix is normally accomplished from a control site called a shift matrix control register. This shift matrix control register contains the binary encoded shift count as will control the magnitude of shift in a unidirectionally shifting shift matrix, plus selector control bits which determine which register or other quantity will be gated to the shift matrix through multiplexor logic elements called selectors. For example, the binary encoded shift count such as would control shifting of zero to fifteen bit positions in a sixteen bit shift matrix would occupy four bit positions. The number of selector control bits is dependent both upon the number of selectors connected to the shift matrix and the number of different registers or quantities controllably gated through each.

For example, to accomplish double precision shifting with selectable sign fill in a sixteen bit shift matrix two selectors—called upper and lower, each capable of selectively gating one of three quantities to the shift matrix—are required. The selector control bits are not encoded and therefore total $2 \times 3 = 6$. The total of count and selector control bits as comprise the low-level shift control of the shift matrix equals $4 + 6 = 10$.

The standard logical means in computer science for translating the relative complexity of the shift control signals into the relative simplicity of the shift count and selector control, as would be held in a shift matrix control register, is the logical means of a Read Only Memory (ROM). The total of shift control signals such as shift count, left or right shift, circular shift with fill, single or double precision, an first or second pass are used to address the ROM. The signals output from the ROM are the shift matrix control signals which, when held in the shift matrix control register, are used to select data input to the shift matrix and to control the shift count within the shift matrix.

Although shift control logics consisting only of a ROM are very simple and straightforward to implement, the size of the ROM becomes large as both the number of shift control signals used for addressing the ROM and the number of output signals required from the ROM increases. A reason that the shift control signals might be numerous is that they reflect a complex shift operation such as double precision shifting or circular shifting. Such complex shift operations support a large and complex repertoire of shift instructions or commands. These more complex shift operations also require an increase in the selector control portion of the signals output from the ROM. For example, a double precision shift operation requires that the contents of two registers and a sign fill quantity each be variously gated under the control of two selectors, upper and lower, to the shift matrix. The three quantities gated times the two selectors controlled equals six shift matrix selector control signals which must be output from the ROM shift logics. This is in addition to the number of final shift count signals, such as are sufficient to control the magnitude of shifting within the unidirectional shift matrix, which also must be output from the shift control ROM.

In recognition that the ROM means of implementing shift control logics, although straightforward, requires a large number of logic elements when the shift process controlled is sophisticated, the art of computer logic design has progressed toward reducing the size requirement for the ROM.

This reduction has been accomplished by encoding the control signals output from the ROM, specifically the selector control signals which are encoded as preselector control signals. The control of a single selector's gating of the three quantities can be encoded in two output signals called preselector signals. The two preselector signals are decoded to develop up to four signals; three of which control gating of the three quantities through each selector. This limitation of the required ROM size in one dimension, through reducing the required number of output signals through encoding, obviously does nothing to reduce the large number of control signals which, by addressing the ROM shift logics, determine the other dimension of ROM size. Of course, the ROM could be eliminated altogether as an implementing means for shift logics and total custom logic circuitry could be employed. But this would be inefficient to design or fabricate.

SUMMARY OF THE INVENTION

The shift matrix preselector control circuit of the present invention strikes a balance between two prior means of implementing control of a shift matrix, and specifically the selection of the quantities that are to be input thereto, in the arithmetic section of a digital computer. The control dealt with is that which transforms the top-level shift control signals such as arise from instruction translation or command directives into the low-level control signals which, as held in a control site such as a shift matrix control register, can be used to control the detailed operation of a shift matrix to effectuate the desired result. One prior means of achieving this control—a custom logic network—is maximally efficient in number of logic elements used but difficult and inefficient to design and implement as integrated logic on a single chip. The other, preferred, prior means of achieving this control—a ROM—is straightforward to design and implement in integrated circuitry but inefficiently utilizes a large number of logic elements and correspondingly large die area when the shift control is sophisticated.

The present invention utilizes an encoded content Read Only Memory (ROM) in conjunction with multiplexor elements to efficiently develop the preselector signals. The ROM is addressed not with all but with only part of the top-level shift control signals. The final shift count is conventionally output from the ROM directly to the control site of the shift matrix control register. The preselector control signals are not, however, output directly from the ROM. Instead, a group of encoded signals associated with each selector, upper and lower, are output. Each group of signals, as are associated with control of a single selector, are received into a first and second multiplexor element. The first multiplexor element is enabled by a single signal which is part of the top-level shift control signals. The second multiplexor element is enabled by the single output of the first multiplexor element. Both multiplexor elements select amongst the encoded inputs under the control of the same two multiplexor selection signals which are also part of the top-level shift control signals. The single signal outputs of the first multiplexor element and the second multiplexor element are the two preselector control signals. Each pair of preselector control signals is conventionally decoded into the four selector control signals which are input to the shift matrix control register.

The net effect of the present invention is to develop the conventional preselector signals, such as are used to develop the selector signals which gate quantities to a shift matrix during computer shift operations, in a special circuit. Such circuit is thus called a shift matrix preselector control circuit. Importantly, the present invention is efficient in limiting the size of the ROM because a number of top-level shift control signals which are conventionally used to address the ROM, adding to the size of the address dimension of the ROM, are instead utilized to further select amongst the encoded signals output from the ROM. Even though these ROM output encoded signals are more numerous than the preselector signals into which they are ultimately reduced, the net effect of reducing the addressing dimension allows preselector control to be accomplished with a reduction of ROM size. In a variant of the present invention particularly configured to support shift control for double precision shifting, the required size of the ROM is reduced by a factor of four from that which would be required to implement shift control solely by ROM means.

The philosophy of the invention is that, in any shift control involving selection of data at the input to a shift matrix, an encoding of a shift matrix control ROM and a modest amount of hardwired multiplexor logics on the encoded output will allow a much reduced ROM size and more efficient utilization of space on an integrated circuit die.

BRIEF DESCRIPTION OF THE DRAWINGS

FIG. 6, consisting of FIG. 6a and FIG. 6b, is an illustration of the encoded contents of the SHIFT MATRIX CONTROL READ ONLY MEMORY.

DESCRIPTION OF THE PREFERRED EMBODIMENT

The present invention was reduced to practice utilizing N-Channel Metal Oxide Semiconductor (NMOS) technology as part of a Very Large Scale Integration (VLSI) single-chip shift matrix, although it is clear that shift matrix preselector control circuits implemented in alternative semiconductor technologies will benefit from the logical design taught herein.

Figure 1:
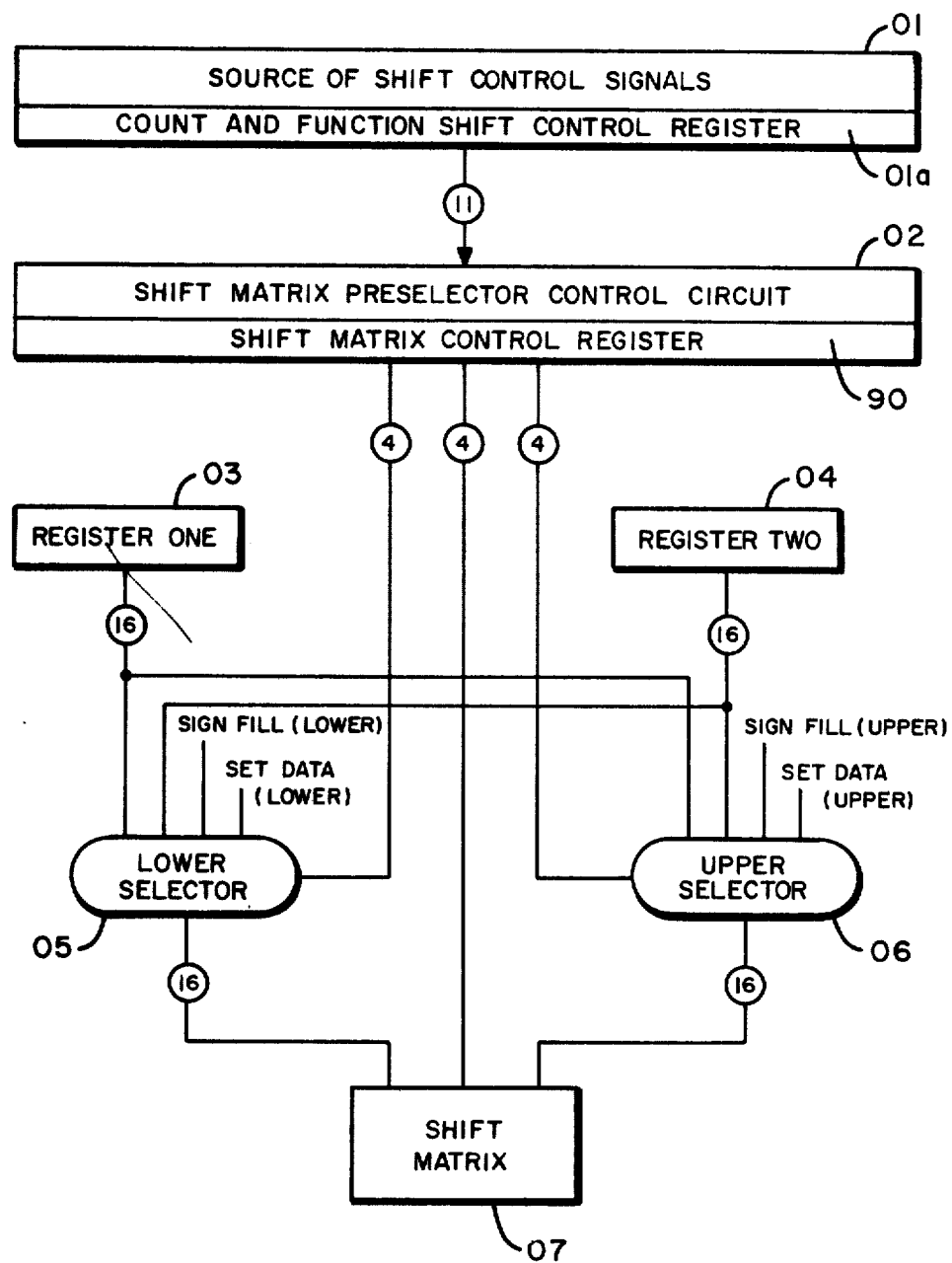
FIG. 1 is an illustration of the computer system structure in which a source of shift control signals, such as arise from instruction translation, are translated by shift control circuitry, such as is the subject of the present invention, into signals controlling the selection of data input to, and the shift count within, a shift matrix.

FIG. 1 is an illustration of the subsystem structure part of a computer system within which the present invention, SHIFT MATRIX PRESELECTOR CONTROL CIRCUIT 02, is a part. This subsystem architecture is typical for translating top-level shift control signals such as arise from instruction translation or command directives into the control of selection to and shifting within a shift matrix. Variations in this architecture are possible in both the number and type of shift control signals which are input to the present invention of SHIFT MATRIX PRESELECTOR CONTROL CIRCUIT 02 and the corresponding number and complexity of the shift matrix control signals which will be output by the present invention in response thereto. The numbers designating the number of signal lines in the various control paths of FIG. 1 represent, specifically, the subsystem structure which attends the preferred embodiment of the present invention of a SHIFT MATRIX PRESELECTOR CONTROL CIRCUIT 02 such as will be discussed in conjunction with FIG. 8. Other embodiments of the present invention, such as will be discussed in conjunction with FIGS. 5 and 7, will reference only a part of the general subsystem structure of FIG. 1.

Continuing in FIG. 1, the SOURCE OF SHIFT CONTROL SIGNALS 01 is a source of top-level shift control signals such as arise from instruction translation or command directives. These shift control signals are held in the COUNT AND FUNCTION SHIFT CONTROL REGISTER 01a wherein they are used to control a single incremental shift operation, such as the first pass of two required during a double precision shift operation. Count and function shift control data can be loaded into COUNT AND FUNCTION SHIFT CONTROL REGISTER 01a from a data and control bus. The register circuit and the other logic structures of FIG. 1 are generally implemented as non-cascadable very large scale integrated circuit logic structures. In other words, the data and control developed is clocked between various stages and within various stages such as the multi-rank non-cascadable SHIFT MATRIX 07 as desired.

The present invention of a SHIFT MATRIX PRESELECTOR CONTROL CIRCUIT 02 may be, however, completely implemented as cascaded very large scale integrated circuit logics ending in SHIFT MATRIX CONTROL REGISTER 90. The timing relationship of the logical structure of SHIFT MATRIX PRESELECTOR CONTROL CIRCUIT 02 relative to the rest of the subsystem logical structures of FIG. 1 is the only timing relationship of pertience to the present invention. This relationship is very simple. The pertinent timing concept is that the shift control inputs to SHIFT MATRIX PRESELECTOR CONTROL CIRCUIT 02, such as are provided by COUNT AND FUNCTION SHIFT CONTROL REGISTER 01a, should be held constant until either (1) the results of the currently directed shift operation are completely recovered from SHIFT MATRIX 07 or, alternatively, (2) these control inputs are translated by SHIFT MATRIX PRESELECTOR CONTROL CIRCUIT 02 and lodged in SHIFT MATRIX CONTROL REGISTER 90 for control of later subsystem structures. In the first alternative, SHIFT MATRIX CONTROL REGISTER 90 need not even exist and the present invention of a SHIFT MATRIX PRESELECTOR CONTROL CIRCUIT 02, implemented as cascaded logics, receives no external timing. The second alternative is preferred. In this alternative SHIFT MATRIX CONTROL REGISTER 90 exists as the terminus of SHIFT MATRIX CONTROL CIRCUIT 02 and a register site in which shift matrix control may be held. In this second alternative, a single clock signal is received by the present invention of a SHIFT MATRIX PRESELECTOR CONTROL CIRCUIT 02. In actual reduction as VLSI logics a central processor which is a source of shift control signals, and which exercises the subsystem structure of FIG. 1, clocks the shift matrix control signals into SHIFT MATRIX CONTROL REGISTER 90 after such suitable delay as allows the cascaded logics of SHIFT MATRIX PRESELECTOR CONTROL CIRCUIT 02 to translate the shift control conditions input from COUNT AND FUNCTION SHIFT CONTROL REGISTER 01a. After such clock time, the input shift control may be removed. Timing is not otherwise a part of the present invention of SHIFT MATRIX PRESELECTOR CONTROL CIRCUIT 02 which is implemented as cascaded logics. Timing is relevant only to the entrance of data and control into, and the extraction of shifted data from, the subsystem of FIG. 1.

Continuing in FIG. 1, the nominal size of COUNT AND FUNCTION SHIFT CONTROL REGISTER 01a is six bits of binary encoded shift count, such as a direct positive left or right shift of zero to sixty-three positions, plus five bits of functional shift control.

Figure 2:
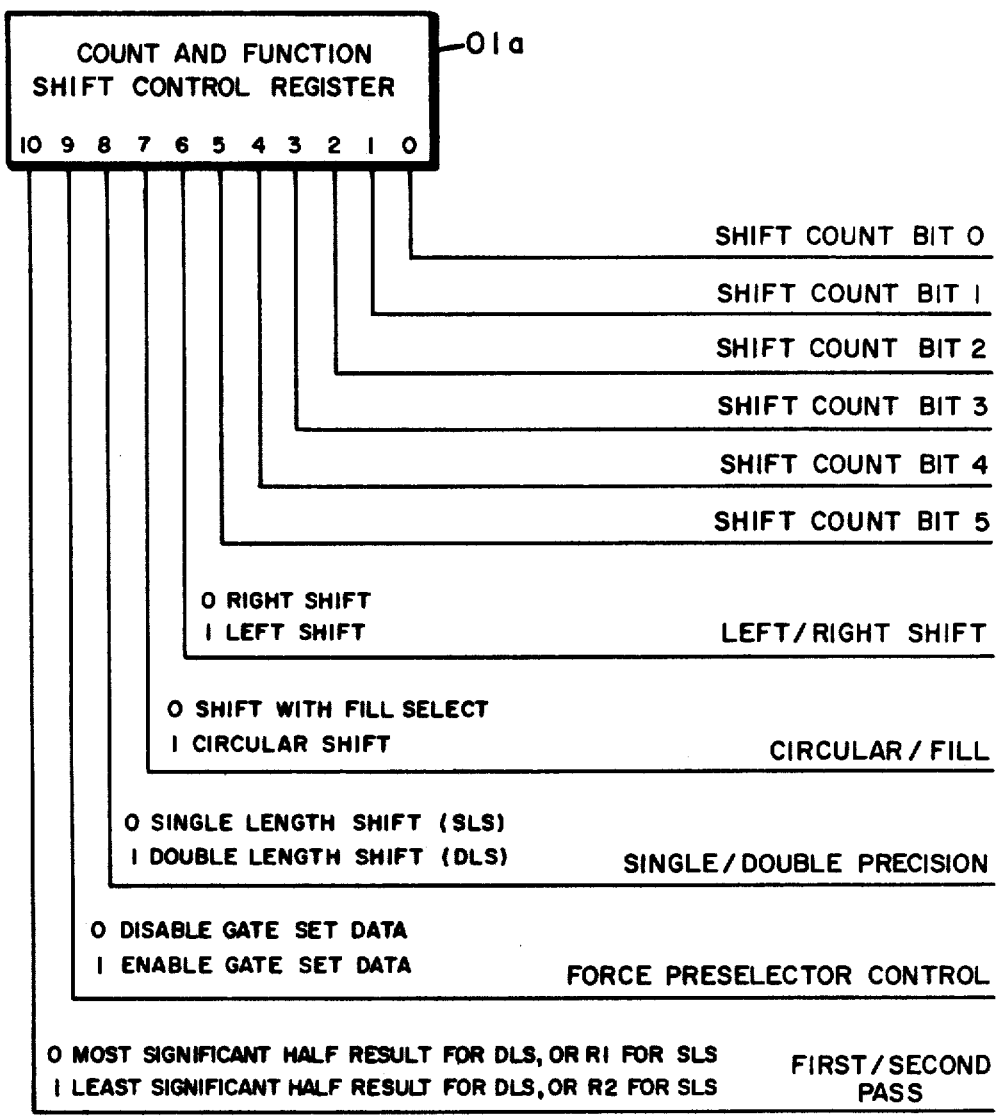
FIG. 2 is an illustration of eleven shift control signals output from eleven bits of the COUNT AND FUNCTION SHIFT CONTROL REGISTER.

Momentarily referring to FIG. 2, the names and functions of the eleven count and function control signals derived from the eleven bits of COUNT AND FUNCTION SHIFT CONTROL REGISTER 01a are illustrated therein. A varying number of these control signals are used in the shift matrix control circuits of FIGS. 3, 4, 5, 7, and 8. Consequently, they are shown in those figures to be derived from a generalized control sources designated SHIFT CONTROL 10a and SHIFT CONTROL 10b which are merely specific versions of the generalized COUNT AND FUNCTION SHIFT CONTROL REGISTER 01a. Momentarily referring to the preferred embodiment of the SHIFT MATRIX PRESELECTOR CONTROL CIRCUIT 02 as illustrated in FIG. 8, it may be noted that all eleven total count and function shift control signals are utilized in this embodiment. Just as the more abbreviated variations of the SHIFT MATRIX PRESELECTOR CONTROL CIRCUIT 02 is discussed in conjunction with FIGS. 3, 4, 5, and 7 utilize fewer than eleven shift control signals, so also is it possible to have an even larger number of signals translated in the manner of the present invention. Such will become obvious when the present invention is discussed in conjunction with FIGS. 5, 7 and 8 and revealed to be a circuit design for general preselector control which is not limited to exactly eleven input control signals.

Continuing in FIG. 1, the SHIFT MATRIX PRESELECTOR CONTROL CIRCUIT 02 translates the count and function shift control signals (eleven in number for the preferred embodiment of the invention) received from COUNT AND FUNCTION SHIFT CONTROL REGISTER 01a into control (four signal lines) of LOWER SELECTOR 05, into control (four signal lines) of UPPER SELECTOR 06, and into control (four signal lines) of SHIFT MATRIX 07. The twelve control signals can be held by twelve bits in the control site of a SHIFT MATRIX CONTROL REGISTER 90, such control site representing the terminus of the present invention of a SHIFT MATRIX PRESELECTOR CONTROL CIRCUIT 02. As already explained in discussion of timing the control flow through the subsystem of FIG. 1, and as will be again explained in the discussion of the invention, there need be no SHIFT MATRIX CONTROL REGISTER 90 to hold these twelve shift matrix control signals if the eleven count and function input shift control signals are maintained constant for such requisite time as allows selected data to be controllably shifted through and recovered from the shift matrix.

Conversely, when SHIFT MATRIX CONTROL REGISTER 90 actually exists then, after such time as it becomes properly set through translation occurring in SHIFT MATRIX PRESELECTOR CONTROL CIRCUIT 02, the eleven bit shift control signals may be removed yet selection to and shifting within the shift matrix can still be controllably managed. In the preferred subsystem of FIG. 1, SHIFT MATRIX CONTROL REGISTER 90 actually exists as a control site into which the twelve translated shift matrix control signals will be clocked once during each utilization of the subsystem of FIG. 1.

Continuing in FIG. 1, SHIFT MATRIX 07 can shift sixteen bit quantities from zero to fifteen bit positions unidirectionally to the left. The four lines of shift control received from SHIFT MATRIX CONTROL REGISTER 90 contain the four bit, binary encoded, left shift count of zero to fifteen bit positions. If, with momentary reference to FIG. 2, it is recalled that the subsystem in FIG. 1 is controllable for left or right shifting then it is obvious that one translation function of SHIFT MATRIX PRESELECTOR CONTROL CIRCUITRY 02 will be to convert right shift counts into the equivalent left shift as will be performed in SHIFT MATRIX 07. In the preferred embodiment of the invention to be discussed in conjunction with FIG. 7, SHIFT MATRIX PRESELECTOR CONTROL CIRCUIT 02 will actually support left or right, single or double precision shifts for input shift counts of zero to sixty-three bit positions.

Continuing in FIG. 1, LOWER SELECTOR 05 and UPPER SELECTOR 06 each gate a sixteen bit quantity to the SHIFT MATRIX 07. Which bit of which quantity will be gated into each of the sixteen bit positions of the shift matrix is a function of the left shift count control applied by SHIFT MATRIX CONTROL REGISTER 90 to SHIFT MATRIX 07, plus the construction by ranks of SHIFT MATRIX 07. A nominal construction for SHIFT MATRIX 07 such as would enable it to shift zero through fifteen bit positions left would be a first rank enabling left shifting of zero, four, eight or twelve bit positions coupled to a second rank enabling left shifting of zero through three bit positions. The left shift count applied from SHIFT MATRIX CONTROL REGISTER 02 is referenced relative to bit zero of the sixteen bits gated through UPPER SELECTOR 06. For example, consider the least significant bit (LSB) input to the first rank of the nominal two rank sixteen bit SHIFT MATRIX 07. If the applied left shift count is zero, then bit zero of the data quantity gated through UPPER SELECTOR 06 will be input to the LSB of SHIFT MATRIX 07.

If the applied left shift count is four, then bit twelve of the data quantity gated through LOWER SELECTOR 05 will be input to the LSB of SHIFT MATRIX 07. Similarly, if the left shift counts were eight and twelve, then bits eight and four, respectively, of the data quantity gated through LOWER SELECTOR 05 will be input to the LSB of SHIFT MATRIX 07. This selection by ranks and by shift count is a standard mode of shift matrix operation.

Continuing in FIG. 1, LOWER SELECTOR 05 and UPPER SELECTOR 06 are each controlled by four selection signals from SHIFT MATRIX CONTROL REGISTER 90. Under control of individual ones of the selection signals, LOWER SELECTOR 05 can select the sixteen bit contents of REGISTER ONE 03, the sixteen bit contents of REGISTER TWO 04, a sixteen bit quantity called SIGN FILL (LOWER), or a sixteen bit quantity called SET DATA (LOWER) as inputs to SHIFT MATRIX 07. Similarly UPPER SELECTOR 06 can controllably select the sixteen bit contents of REGISTER ONE 03, the sixteen bit contents of REGISTER TWO 04, or a sixteen bit quantity called SIGN FILL (UPPER), or a sixteen bit quantity called SET DATA (UPPER) as inputs to SHIFT MATRIX 07. The REGISTER ONE 03, abbreviated in this specification as R1, is a sixteen bit register which holds a single length (sixteen bit) shift input data word or the most significant half input data word for double length (thirty-two bit) shifts. The REGISTER TWO 04, abbreviated in this specification as R2, is a sixteen bit register which holds a single length (sixteen bit) shift input or the least significant half input data word for double length (thirty-two bit) shifts. The two sixteen bit quantities SIGN FILL (LOWER) and SIGN FILL (UPPER) are required only if that shift instruction repertoire giving the SOURCE OF SHIFT CONTROL SIGNALS 01 includes a selectable sign fill function during shifting. A sign fill function merely means the most significant bit, or sign bit, or a right shifted quantity will be filled into all bit positions vacated during the right shifting of such quantity. The only quantities input to SHIFT MATRIX 07 which have sign bits come from REGISTER ONE 03 and REGISTER TWO 04. Consequently, and in the simplest and most rudimentary form, the quantity SIGN FILL (LOWER) which is input to LOWER SELECTOR 05 would simply be a sixteen bit all zeros or all ones data word as reflects the zero or one state of bit $2^{15}$ of REGISTER ONE 03. Similarly, the quantity SIGN FILL (UPPER) which is input to UPPER SELECTOR 06 would be a sixteen bit all zeros or all ones data word as reflects to zero or one state of bit $2^{15}$ of REGISTER TWO 04.

Generation, selection, or management of the SIGN FILL (LOWER) and SIGN FILL (UPPER) quantities is not integral to the present invention of a SHIFT MATRIX PRESELECTOR CONTROL CIRCUIT 02. It need merely be noted, by momentary reference to signal CIRCULAR/FILL as appears in FIG. 2 and the gating control of LOWER SELECTOR 05 and UPPER SELECTOR 06 as appear in FIG. 1, that the present invention of a SHIFT MATRIX PRESELECTOR CONTROL CIRCUIT 02 can perform a translation which enables selection of SIGN FILL (LOWER) through LOWER SELECTOR 05 or SIGN FILL (UPPER) through UPPER SELECTOR 06 as inputs to SHIFT MATRIX 07. The final input to LOWER SELECTOR 05—the quantity SET DATA (LOWER)—is related in usage to the final quantity input to UPPER SELECTOR 06—the quantity SET DATA (UPPER). This relationship is shown in the preferred embodiment of SHIFT MATRIX PRESELECTOR CONTROL CIRCUIT 02, such as will be discussed in conjunction with FIG. 7, wherein the quantity SET DATA (LOWER) is selected by LOWER SELECTOR 05 to be input to SHIFT MATRIX 07 if, and only if, the quantity SET DATA (UPPER) is concurrently selected by UPPER SELECTOR 06 to be input to SHIFT MATRIX 07. Both quantities SET DATA (LOWER) and SET DATA (UPPER) are completely arbitrary, and merely represent data which is fixed or set. In one usage of the subsystem of FIG. 1 to support expanded functions in a microcontroller neither related to the present invention nor shifting, the quantity SET DATA (LOWER) was set to all ones while SET DATA (UPPER) was zeros in the ten most significant bits and hardwired to bits five through zero of COUNT AND FUNCTION SHIFT CONTROL REGISTER 01a in the six least significant bits.

In summary of FIG. 1, the present invention of a SHIFT MATRIX PRESELECTOR CONTROL CIRCUIT 02 is seen to perform a translation and control function intermediately located between, as a source of inputs, a SOURCE OF SHIFT CONTROL SIGNALS 02, and, as elements receiving outputs, SHIFT MATRIX 07, LOWER SELECTOR 05, and UPPER SELECTOR 06. The four quantities gated through each of LOWER SELECTOR 05 and UPPER SELECTOR 06 are merely those associated with the utilization of the subsystem of FIG. 1 in support of the preferred embodiment of SHIFT MATRIX PRESELECTOR CONTROL CIRCUIT 02, such preferred embodiment as manages double precision shifting.

Even with such preferred embodiment, an excess capability to control selection in LOWER SELECTOR 05 and UPPER SELECTOR 06 of fourth data quantities not essential to double precision shifting has been noted. The present invention of a SHIFT MATRIX PRESELECTOR CONTROL CIRCUIT 02 is configurable and expandable for the control of selection of data to, and shifting within, a shift matrix. After the invention has been explained, FIG. 1 may be reviewed in consideration of how the control scheme of the present invention might profitably be expanded for control of more than two selectors, and/or gating control of more or different quantities through each or any selector. For such a subsystem expansion, the control applied by SOURCE OF SHIFT CONTROL SIGNALS 02 would also be extended to encompass whatever is trying to be done with this shift subsystem; for example, triple precision shifting. The present invention teaches no such expanded processes but, as an efficient shift matrix control circuit, is adaptable to the complex and comprehensive control of a shift matrix required in such expanded processes.

Figure 3:
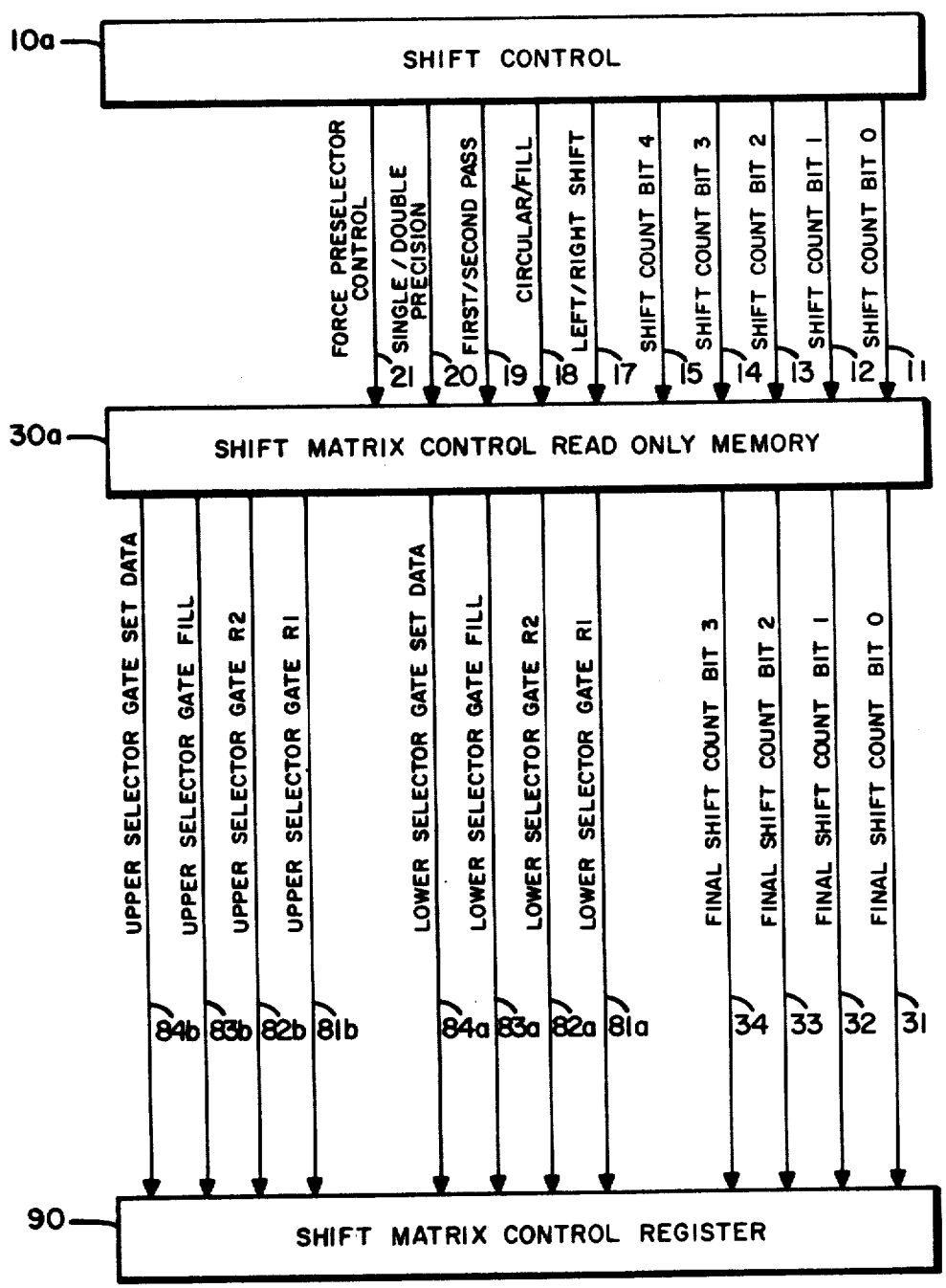
FIG. 3 is an illustration of a basic prior art structure for logically transforming shift control signals into shift matrix control signals via ROM means.

FIG. 3 shows a prior art structure that is utilized to transform top-level shift control signals such as arise from instruction translation or command directives into the low-level signals controlling a shift matrix. SHIFT CONTROL 10a is the source of control signals such as would suffice to control double precision shifting in a sixteen bit shift matrix. Signals SHIFT COUNT BIT 0 through SHIFT COUNT BIT 4 on lines 11 through 15 represent represent the binary encoded shift count of zero to thirty-one. The signal LEFT/RIGHT SHIFT on control line 17 assumes one of two states dependent upon whether the desired shift count is for a right or a left shift. The signal CIRCULAR/FILL on control line 18 assumes one binary state when a circular fill is desired during end-round shifting and an alternative binary state when no such fill is desired. The signal SINGLE/DOUBLE PRECISION on control line 20 indicates in the alternative whether single, (sixteen bit) or double precisioN (thirty-two bit) shifting is to transpire. If double precision shifting is indicated the signal FIRST/SECOND PASS on line 19 further determines which pass through the sixteen bit shift matrix is to next transpire. Two passes are necessary to shift with double precision. The signal FORCE PRESELECTOR CONTROL on line 21 directs the gating of a predetermined data pattern to the shift matrix.

Continuing in FIG. 3, the logical means for transforming the shift control signals on lines 11 through 15 and 17 though 20 into the signals that are necessary for the control of a sixteen bit shift matrix capable of double precision shifting with fill is the SHIFT MATRIX CONTROL READ ONLY MEMORY 30a. This prior art ROM logical means operates so that each addressable location when addressed by a unique combination of shift control signals will output the selector gating control and final shift count signals that are appropriate to gate a quantity to the shift matrix and control the amount of shifting within the shift matrix. The programmed contents of this prior art SHIFT MATRIX CONTROL READ ONLY MEMORY 30a will be dependent upon what shift operations the overall system is managing and can be routinely generated by a practitioner in the art. In FIG. 6 the actual contents of a ROM will be listed so that it may be generally seen, for example, how the final shift count depends upon the input shift count plus the input control signal specifying the shift to be either right or left.

Continuing further in FIG. 3, the shift matrix control signals such as would suffice to control double precision shifting with fill of a sixteen bit shift matrix are output from SHIFT MATRIX CONTROL READ MEMORY ONLY 30a on lines 31 through 34, 81a through 84a, and 81b through 84b. The signals FINAL SHIFT COUNT 0 through FINAL SHIFT COUNT 3, on lines 30 through 34, carry the four binary encoded bits which are sufficient to control unidirectional shifting of zero to fifteen decimal places within a sixteen bit shift matrix. Shift matrix control signals on lines 81a through 84a are for gating control of a lower selector. Shift matrix control signals on lines 81b through 84b are for gating control of an upper selector. A selector controls gating of a full sixteen bit quantity input to the sixteen bit shift matrix. Two selectors, designated lower selector and upper selector, are required in order that double precision shifting may be performed. Control of each selector, lower and upper, requires that each selector be alternatively enabled to GATE R1 as controlled by signals on lines 81a and 81b, respectively; to GATE R2 as controlled by signals on lines 82a and 82b, respectively; to GATE FILL as controlled by signals on lines 83a and 83b respectively; or to GATE SET DATA as controlled by signals on lines 84a and 84b, respectively. These four types of gate control signals simply mean that the selector should gate the contents of register 1, register 2, sign fill quantity, or a set data pattern to the shift matrix.

The ability of a selector to gate a set data pattern is not necessary to accomplish control of a shift matrix for double precision shifting. The GATE SET DATA signals on lines 84a and 84b are included here as a capability sometimes implemented, and for parallelism with the capabilities of further, improved, circuitry such as will be shown in FIGS. 4, 7, and 8. The total size of SHIFT MATRIX CONTROL READ ONLY MEMORY 30a in FIG. 3 is $2^{10}$ or 1024 addressable locations of twelve bits each.

Continuing in FIG. 3, SHIFT MATRIX CONTROL REGISTER 90 is the control site in which the final shift count and selector control signals are held so that they may be used to control operation of the shift matrix. This buffer register and final control site would not be necessary if the time of extracting the shifted data product from the output of the shift register (shown in FIG. 1) was controlled to be properly timewise related to the stable addressing of the SHIFT MATRIX CONTROL READ ONLY MEMORY 30a. Prior art embodiments of FIG. 3 utilizing VLSI circuitry generally do use a SHIFT MATRIX CONTROL REGISTER 90. In any case, the concept of a shift matrix control register is useful to show that there exists a level and a time within the shift logics wherein top level shift control signals have been finally converted to the control signals for the shift matrix. Applicants' invention to be described deals with the process of this conversion and the apparatus for so performing this conversion.

Figure 4:
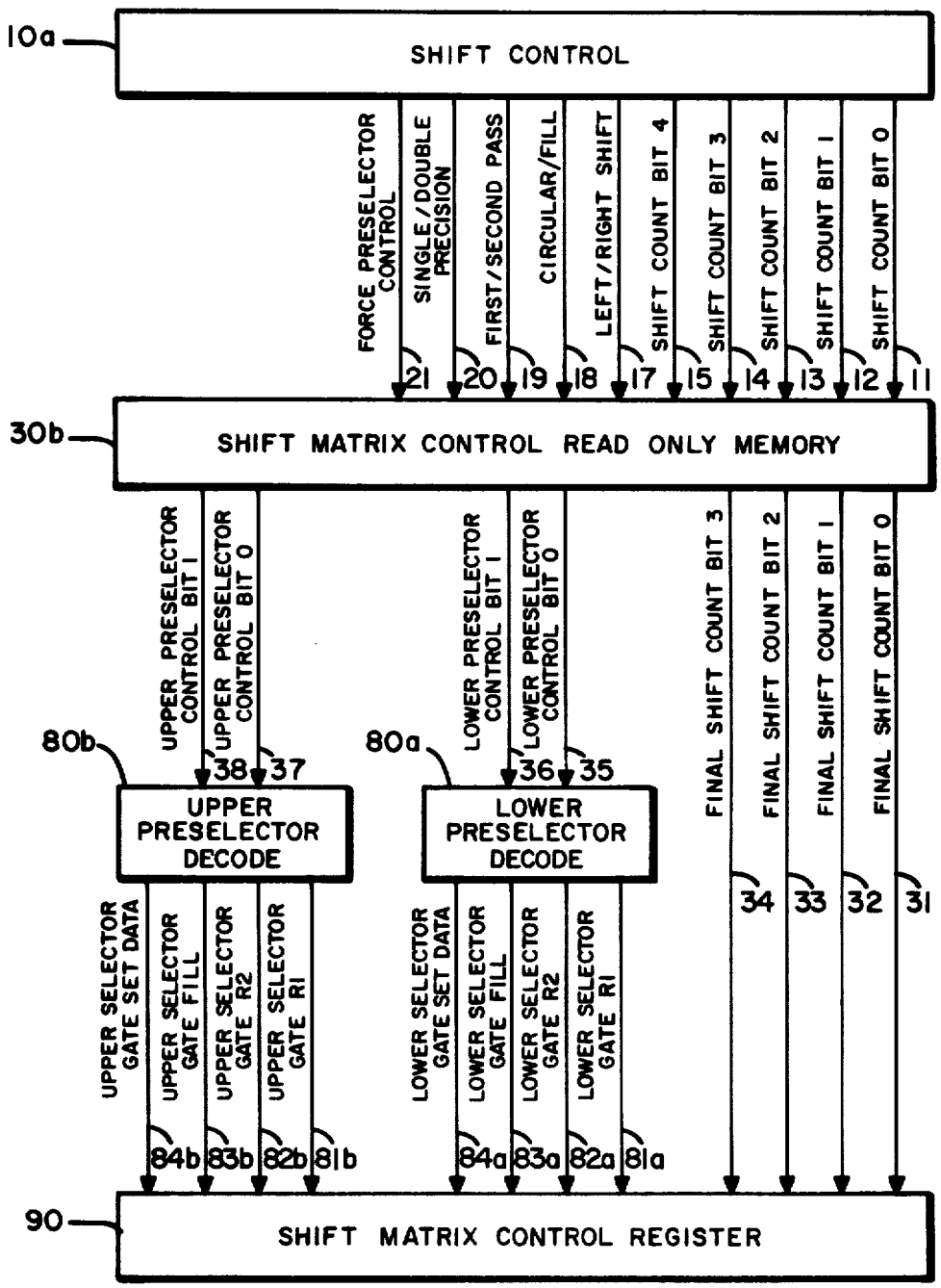
FIG. 4 is an illustration of a prior art improvement on the structure of FIG. 1 wherein the number of output signals required from the ROM is reduced through encoding the selector control as preselector control signals.

FIG. 4 shows an improved prior art circuit for implementing that shift matrix control. The immediately observable difference in comparison to prior art in FIG. 3 is the existence of LOWER PRESELECTOR DECODE 80a and UPPER PRESELECTOR DECODE 80b circuitry and associated signals. The purpose of this prior art improvement is to reduce the size of the SHIFT MATRIX CONTROL READ ONLY MEMORY 30b by encoding the output signals used for selector control in a manner similar to the way that signals FINAL SHIFT COUNT 0 through FINAL SHIFT COUNT 3 on lines 31 through 34 are binary encoded.

The four control signals carried on lines 81a through 84a that gate the lower selector are encoded in two signals, LOWER PRESELECTOR CONTROL BIT 0 on line 35 and LOWER PRESELECTOR CONTROL BIT 1 on line 36, which are output from SHIFT MATRIX CONTROL READ ONLY MEMORY 30a. Correspondingly, the control signals on lines 81b through 84b for the upper selector are encoded in signal UPPER PRESELECTOR CONTROL BIT 0 on line 37 and in signal UPPER PRESELECTOR CONTROL BIT 1 on line 38.

These signals are called "preselector control" signals because the control encoded therein is "pre", or in advance of, the selector control signals. The LOWER PRESELECTOR DECODE 80a and UPPER PRESELECTOR DECODE 80b are simple decoder logic circuits routinely fashioned from gates. They translate each of the four states jointly assumable by the two input lines, e.g. lines 35 and 36, into a single output signal on one of the output lines, e.g. lines 81a, 82a, 83a or 84a. The net result of these added Preselector Decode logic circuits 80a and 80b in FIG. 4 is that the SHIFT MATRIX CONTROL READ ONLY MEMORY 30b is reduced to eight bits per addressable location from the twelve bits required to implement SHIFT MATRIX CONTROL READ ONLY MEMORY 30a in FIG. 3. This prior art improvement makes no reduction in the addressing space of the ROM, however, which remains at 1024 addresses as accessed by ten address lines 11 through 21.

Figure 5:
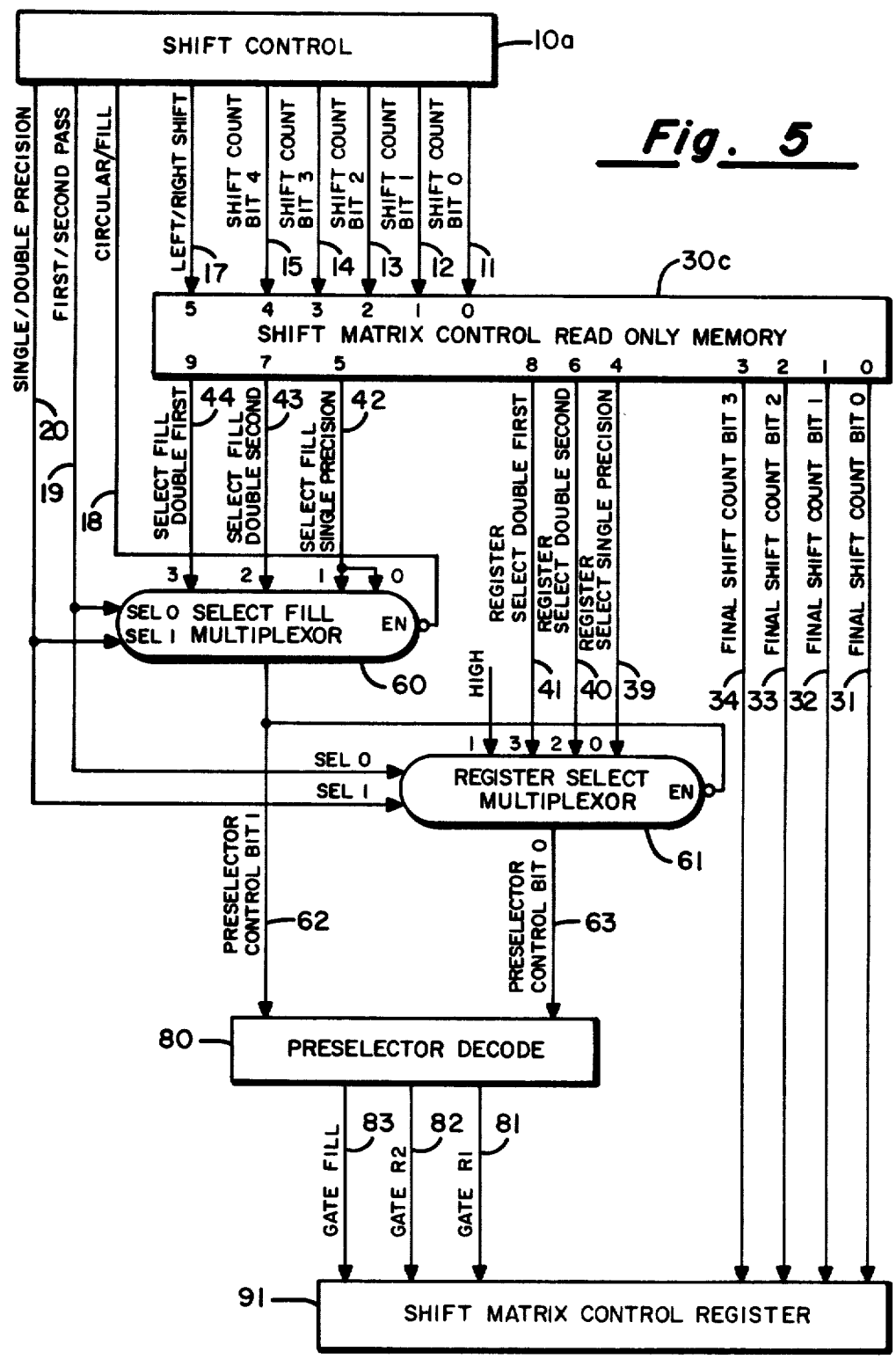
FIG. 5 is an illustration of the simple and rudimentary core of the invention more so that the first principles of operation may be clearly observed than that this abbreviated embodiment should be used to implement any well-balanced actual repertoire of shift instructions.

The core of the present invention is revealed in FIG. 5 in a simple and rudimentary form so that first principles may be more easily observed. The present invention embodies the concept that the use of interconnected logic elements, namely multiplexors, between the SHIFT CONTROL READ ONLY MEMORY 30c and the PRESELECTOR DECODE 80 can very effectively serve to reduce the overall size of the ROM. This reduction in ROM size is accomplished by enabling and gating the added multiplexor logic elements via shift control signals which priorly would have been used to address the ROM. Furthermore, the ROM must be especially encoded with new signals that will ultimately, under multiplexor selection, be resolved into the preselector control signals. The present invention will be described in FIGS. 5 and 7, culminating in a preferred embodiment in FIG. 8 which is believed to be an exceedingly efficient combinational balance of READ ONLY MEMORY (ROM) and logic means for accomplishing the double precision shift control of a sixteen bit shift matrix. As the invention is described it will become apparent to those skilled in the art that a slightly different balance between ROM and logic means might be taken in implementing shift control. Such variations and modifications will be seen to be within the spirit and scope of the presently claimed invention if, in the following description, it is recognized that shift control signals heretofore used only to address a ROM, or else solely as inputs to logic means are used to gate the output of a ROM in order to develop shift matrix control signals in general and specifically the preselector control signals.

Continuing in FIG. 5, it must be firstly noted that this limited and rudimentary embodiment as will be described is, although operative, not fully configured and not fully capable of supporting shift matrix preselection for double precision shifting with fill. Specifically, and as will be further developed in the preferred embodiment of FIG. 8, fully versatile and capable preselection for double precision shifting requires control of two preselectors. The apparatus of FIG. 5 is for the simplistic control of a single preselector in order that first principles of the present invention may be more readily observed.

Continuing in FIG. 5, SHIFT CONTROL 10a is the source of top-level shift count and control signals on lines 11 through 15 and 17 through 20. Of these signals only the five signals SHIFT COUNT 0 through SHIFT COUNT 4, on lines 11 through 15, and the signal LEFT/RIGHT SHIFT on line 17 are used to address the SHIFT MATRIX CONTROL READ ONLY MEMORY 30c, wherein they are collectively respectively assigned to address bits zero through five. A left shift is represented by a logical High, or "1", on line 17. Each of the sixty-four addressable locations of SHIFT MATRIX CONTROL READ ONLY MEMORY 30c addressed by these six signals responsively outputs ten total signals in four functional categories. The first category is the final shift count output from SHIFT MATRIX CONTROL READ ONLY MEMORY 30c bits zero through three as the signals FINAL SHIFT COUNT BIT 0 through FINAL SHIFT COUNT BIT 3, on lines 31 through 34, respectively. The three remaining categories of two signals each are encoded for control of selection during single and double precision shift operations. It is from these six signals that further logics will develop two preselector signals, and from the decode of these two preselector signals four selector signals. These three selection categories are as follows: selection control for single precision shifting is output from SHIFT MATRIX CONTROL READ ONLY MEMORY 30c bits four and five on lines 39 and 42; selection control for the second pass of double precision shifting is output from SHIFT MATRIX CONTROL READ ONLY MEMORY 30c bits six and seven and lines 40 and 43; and selection control for the first pass of double precision shifting is output from SHIFT MATRIX CONTROL READ ONLY MEMORY 30c bits eight and nine on line 41 and 44.

Within each of the three categories, the signal arising from the least significant bit position is encoded for selection between two registers as follows: a binary "0" means that register one (R1) should be gated through a selector, whereas a binary "1" means that register two (R2) should be gated through a selector. Within each of the three categories, the signal arising from the most significant bit position is encoded for selection of a sign fill quantity as follows: a binary "1" means that a sign fill quantity (FILL) should be gated through a selector, whereas a binary "0" means that the sign fill quantity should not be gated through a selector.

The encoding of the sixty-four addresses of SHIFT MATRIX CONTROL READ ONLY MEMORY 30c is contained as the partial contents of the SHIFT MATRIX CONTROL READ ONLY MEMORY TABLE in FIG. 6. The sixty-four input addresses are listed in binary coded form in the Input Address Bits column. Since the rudimentary embodiment of SHIFT MATRIX CONTROL READ ONLY MEMORY 30c in FIG. 5 is for development of control signals for only a single selector, only bits zero through nine of the Output Shift Matrix Control ROM Bits are used. The remaining output bits ten through fifteen of the SHIFT MATRIX CONTROL READ ONLY MEMORY TABLE will be utilized in the embodiment illustrated in FIG. 8.

Returning to FIG. 5, signals FINAL SHIFT COUNT 0 through FINAL SHIFT COUNT 3 on lines 31 through 34 are output directly from SHIFT MATRIX CONTROL READ ONLY MEMORY 30c to SHIFT MATRIX CONTROL REGISTER 91 wherein they are held to effect left shift control of the shift matrix (shown in FIG. 1). These binary encoded four bits are sufficient to control left shifting of zero to fifteen places in a sixteen bit unidirectional shift matrix. Simultaneously referring to FIG. 6, and recalling that LEFT/RIGHT SHIFT on line 17 (Input Address Bit 5) is a logical high or "1" for a left shift, it may be seen how the input signals SHIFT COUNT BIT 4 through SHIFT COUNT BIT 0 on lines 15 through 11 (Input Address Bits 4 through 0) are transformed into the signals FINAL SHIFT COUNT BIT 3 through FINAL SHIFT COUNT BIT 0 on lines 34 through 31 (Output Shift Matrix Control ROM Bits 3 through 0). Quite simply, a right shift can be accomplished in a left shifting shift matrix by a circular left shift equal in magnitude to the two's complement of the right shift count.

For example, for a right shift count of "1" as is represented by the second entry in the SHIFT MATRIX CONTROL READ ONLY MEMORY TABLE, the output final shift count to a left shifting shift matrix is fifteen, or a logical High on Output Shift Matrix Control ROM bits zero through 3.

Correct overall control of the shift matrix will additionally depend upon gating the proper quantity to the shift matrix to be left shifted by the designated final shift count. Continuing in FIG. 5, this selection function is supported by SELECT FILL MULTIPLEXOR 60 and REGISTER SELECT MULTIPLEXOR 61 plus the associated signal interconnections. The inputs to these elements are the specially encoded signals from bits four through nine output from SHIFT MATRIX CONTROL READ ONLY MEMORY 30c and tabularized in FIG. 6. The SELECT FILL MULIPLEXOR 60 and the REGISTER SELECT MULTIPLEXOR 61 respectively output signals PRESELECTOR CONTROL BIT 1 line 62 and PRESELECTOR CONTROL BIT 0 line 63. The control which is realized in the rudimentary implementation of FIG. 5 will allow these two signals, jointly and respectively, to assume the three control values 00, 01 and 10. The purpose of these three control values achieved is to allow translation in PRESELECTOR DECODE 80, a simple gate circuit as is common in the art, of three corresponding gate control signals which, when held in SHIFT MATRIX CONTROL REGISTER 91, will effect gating control through the selectors (shown in FIG. 1) of various designated inputs to the shift matrix (shown in FIG. 1). The translation in PRESELECTOR DECODE 80 will cause a zero value for both signals PRESELECTOR CONTROL BIT 1 on line 62 and signal PRESELECTOR CONTROL BIT 0 on line 63 to result in the single output signal GATE R1 on line 81. Similarly, a zero and one on lines 62 and 63 respectively, is translated in PRESELECTOR DECODE 80 as signal GATE R2 line 82. A one and zero on lines 62 and 63, respectively, signal GATE FILL on line 83. These three signals respectively mean that register one, register two or a sign fill quantity is to be gated to the shift matrix.

Returning to the center of FIG. 5, each of the SELECT FILL MULTIPLEXOR 60 and REGISTER SELECT MULTIPLEXOR 61 has an enablement input, two select inputs, and four signal inputs.

The enablement signal to SELECT FILL MULTIPLEXOR 60 is the signal CIRCULAR/FILL on line 18 which originates at SHIFT CONTROL 10a. When this signal CIRCULAR/FILL on line 18 is a logical High then a circular fill is desired and SELECT FILL MULTIPLEXOR 60 will not be enabled, causing a logic Low, or 0, signal PRESELECTOR CONTROL BIT 1 on line 62. Conversely, when a circular fill is not desired signal CIRCULAR/FILL on line 18 will be Low and SELECT FILL MULTIPLEXOR 60 will be enabled, under control of the two select inputs, to select amongst four input signals.

Continuing in FIG. 5, the operation of both SELECT FILL MULTIPLEXOR 60 and REGISTER SELECT MULTIPLEXOR 61 is to selectively gate, when enabled, a single one of four input signals under the selection control of a least significant, SEL 0, and a most significant, SEL 1, selection input. When the signal at the SEL 1 input is a logical Low, or 0, and the signal at the SEL 0 input is a logic Low, or 0, then the signal connected to input 0 will be selectively gated. When signals at selection inputs SEL 1 and SEL 0 are respectively a logical 0 and 1, then the input signal connected to input 1 will be selectively gated. When the signals at SEL 1 and SEL 0 are respectively a logical 1 and 0, the input signal connected to input 2 will be selectively gated. Finally, when the signals at selection inputs SEL 1 and SEL 0 are respectively a logical 1 and 1, then the input signal connected to input 3 will be selectively gated.

Continuing in FIG. 5, the results of this operation may be interpreted for SELECT FILL MULTIPLEXOR 60. The most significant, SEL 1, selection input into SELECT FILL MULTIPLEXOR 60 is the signal SINGLE/DOUBLE PRECISION on line 20 which originates at SHIFT CONTROL 10a. This signal will be a logical High, or 1, only for a double precision shift operation. From the operation of SELECT FILL MULTIPLEXOR 60, the input 3—signal SELECT FILL DOUBLE FIRST on line 44—or the input 2—signal SELECT FILL DOUBLE SECOND on line 43—will only be selected during double precision shifting. Conversely, SELECT FILL MULTIPLEXOR 60 inputs 1 and 0, which are logically ANDed to the single signal SELECT FILL SINGLE PRECISION on line 42, will always be selected for a single precision shift operation as represented by a logical Low level of signal SINGLE/DOUBLE PRECISION on line 20.

Continuing with the operation of SELECT FILL MULTIPLEXOR 60 in FIG. 5, signal FIRST/SECOND PASS on line 19, originating at SHIFT CONTROL 10a, is the least significant, SEL 0, select input. Operating in a similar manner to signal SINGLE/DOUBLE PRECISION on line 20, the signal FIRST/SECOND PASS on line 19 is a logical High for a first pass of double precision shifting and a logical Low for the second pass in double precision shifting. When signal SINGLE/DOUBLE PRECISION on line 20 is a logical High, indicating double precision shifting, then signal FIRST/SECOND PASS on line 19 will selectively control the gating of signal SELECT FILL DOUBLE FIRST on line 44 or signal SELECT FILL DOUBLE SECOND on line 43. Thus signal SELECT FILL MULTIPLEXOR 60 may be seen to gate, when circular fill is not desired, that select fill signal from SHIFT MATRIX CONTROL READ ONLY MEMORY 30c which is appropriate for single precision, double precision first pass, or double precision second pass shifting. These select fill signals are themselves properly set as either logical High (1) or logical Low (0) in the encoding of SHIFT MATRIX CONTROL READ ONLY MEMORY 30c. A routineer in the art may, recalling that signal SELECT FILL DOUBLE FIRST on line 44, signal SELECT FILL DOUBLE SECOND on line 43, and signal SELECT FILL SINGLE PRECISION on line 42 are output from SHIFT MATRIX CONTROL READ ONLY MEMORY 30c as output bits 9, 7, and 5 respectively, momentarily look to FIG. 6 and consider the function of SELECT FILL MULTIPLEXOR 60 to determine that signal PRESELECTOR CONTROL BIT 1 on line 62 will indeed be set only for certain combinations of control output from SHIFT CONTROL 10a. Recalling that the signal PRESELECTOR CONTROL BIT 1 on line 62 must be a logical High in order to develop the signal GATE FILL on line 83 output from PRESELECTOR DECODE 80, this combination of control output from SHIFT CONTROL 10a which produces a logical High signal PRESELECTOR CONTROL BIT 1 is the control for which a sign fill is desired to be gated to the shift matrix. That is why SELECT FILL MULTIPLEXOR 60 is called a "FILL" multiplexor—it is involved in selecting a sign fill type control signal such as eventually gates a selector (shown in FIG. 1). In the rudimentary embodiment of FIG. 5, the fill control which is accomplished is that normally associated with but one, the lower, of the two selectors shown in FIG. 1 which are required to effect a fully enabled double precision shift operation. The complete, and preferred, embodiment will be discussed in association with FIG. 8.

Continuing in FIG. 5, the operation of REGISTER SELECT MULTIPLEXOR 61 is equivalent to the just discussed operation of SELECT FILL MULTIPLEXOR 60. The REGISTER SELECT MULTIPLEXOR 61 produces the signal PRESELECTOR CONTROL BIT 0 on line 63 which is decoded in PRESELECTOR DECODE 80 to produce signal Gate R1 on line 81 or signal GATE R2 on line 82, which signals control (register) select gating to the shift matrix. It may be immediately noted in the operation of REGISTER SELECT MULTIPLEXOR 61 that a logical Low enablement signal is present only when signal PRESELECTOR CONTROL BIT 1 on line 62 is a logical Low, meaning that a fill is not to be gated to the shift register. Continuing, the same select signals of FIRST-/SECOND PASS on line 19 for the least significant select input and SINGLE/DOUBLE PRECISION on line 20 for the most significant select input serve to select amongst the four signal inputs to REGISTER SELECT MULTIPLEXOR 61. Of the four signal inputs to REGISTER SELECT MULTIPLEXOR 61 inputs 0, 2 and 3—which are the signals REGISTER SELECT SINGLE PRECISION on line 39, REGISTER SELECT DOUBLE SECOND on line 40, and REGISTER SELECT DOUBLE FIRST on line 41—originate at SHIFT CONTROL READ ONLY MEMORY 30c as output bits 4, 6 and 8 respectively. Input 1 to REGISTER SELECT MULTIPLEXOR 60 is always a logical High, or 1. This input 1 would be selected when signal SINGLE/DOUBLE PRECISION on line 20 is a logical Low, meaning single precision shifting, and signal FIRST/SECOND PASS on line 19 is a logical High, meaning first pass. As would be appropriate for such conditions, signal PRESELECTOR CONTROL BIT 0 on line 62 will resultantly be a logical High and R1 will resultantly be gated to the shift matrix. For other combinations of the select signals on lines 19 and 20, the appropriate one of the three signals on lines 39, 40, or 41 input to REGISTER SELECT MULTIPLEXOR 60 from SHIFT MATRIX CONTROL READ ONLY MEMORY 30c will be selected.

Again a routineer in the art can now associate the selection based on single or double precision shifting and first or second pass of such shifting as is accomplished in both SELECT FILL MULTIPLEXOR 60 and REGISTER SELECT MULTIPLEXOR 61 with the selective gating of designated (addressed) control levels from the SHIFT MATRIX CONTROL READ ONLY MEMORY 30c as are pertinent to selecting register or fill input to a shift matrix during shift operations.

A routineer will also note that the shift matrix preselector control circuit of FIG. 5, although powerful and efficient in its utilization of shift control signals for multiplexed selection amongst ROM outputs and in the hierarchical interconnection of a fill and a select multiplexor, is somewhat arbitrary in that it is rudimentary and incomplete for generalized management of selection to a shift matrix during double precision shifting. Specifically, preselector control of only a single selector is accomplished whereas two selectors (shown in FIG. 1) are required for generalized management of selection to a shift matrix during double precision shifting. The preselector control encoded in SHIFT MATRIX CONTROL READ ONLY MEMORY 30c bits zero through nine, as listed in FIG. 6, is actually the preselector control normally associated with one only, designated the lower, selector. Lack of preselector control for the other, upper, selector in the rudimentary embodiment of FIG. 5 could be considered to always cause logical zeros to be input to the shift matrix in lieu of actual register or fill quantities. Thus the rudimentary embodiment of FIG. 3, has a limited and arbitrary utility and is presented for the demonstration of first principles of the present invention, a shift matrix preselector control circuit.

Figure 7B:
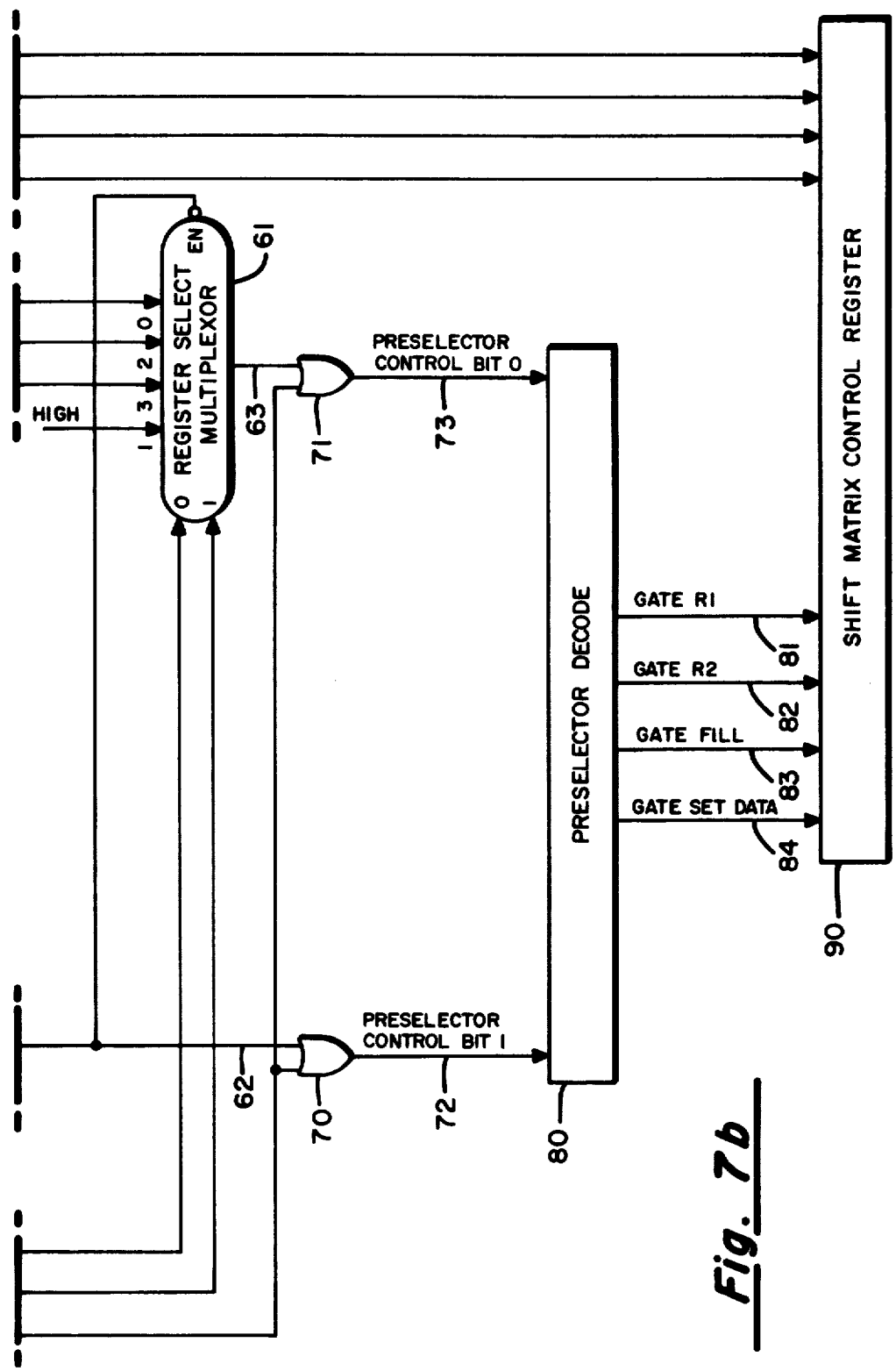
FIG. 7, consisting of FIG. 7a and FIG. 7b, is an illustration of a further elaboration of the basic invention of FIG. 5 more so that extended principles of operation may be clearly observed than that this still abbreviated embodiment should be used to implement any well-balanced actual repertoire of shift instructions.
Figure 8B:
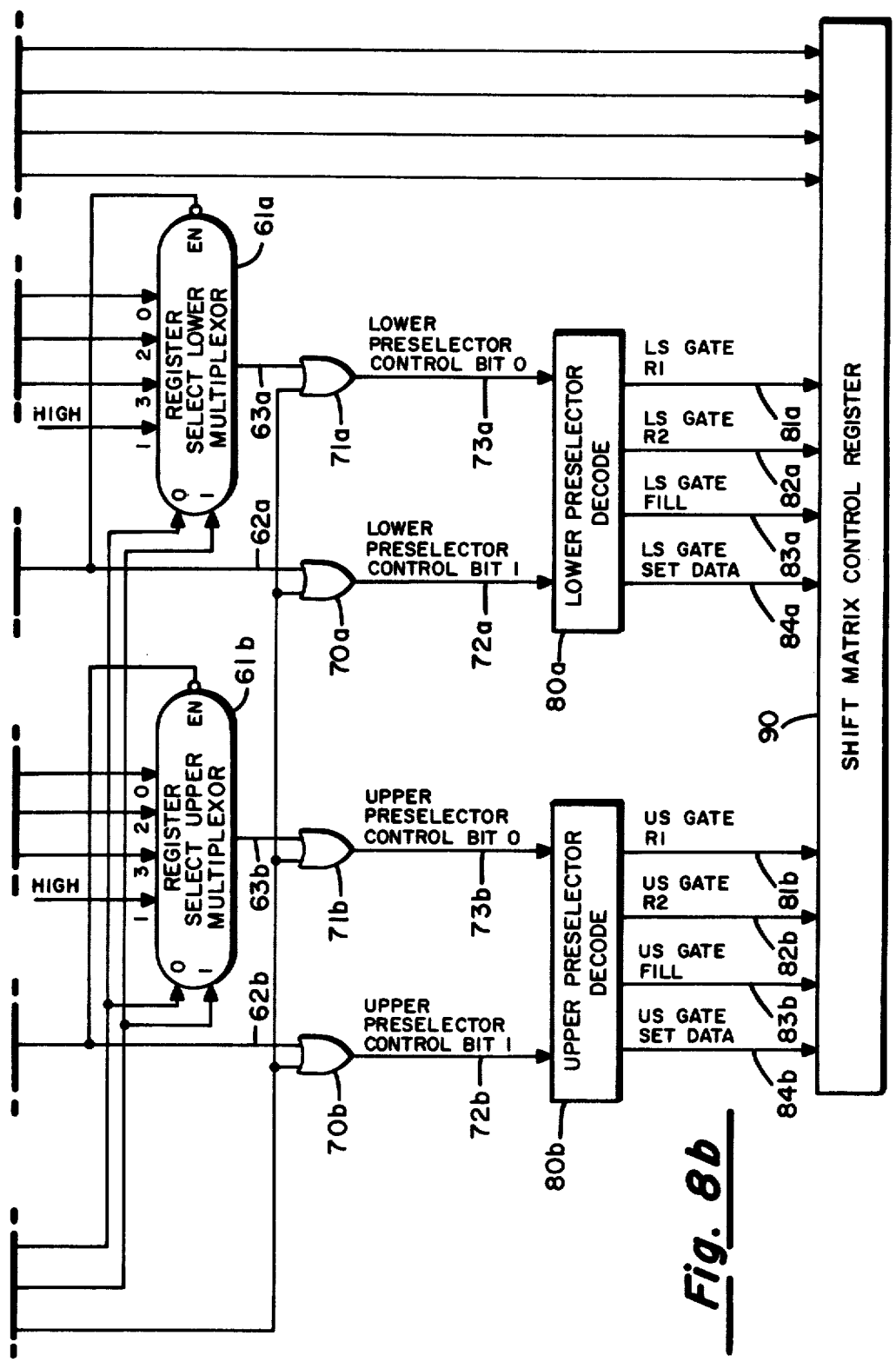
FIG. 8, consisting of FIG. 8a and FIG. 8b, is an illustration which includes the principles of FIGS. 3 and 4 when applied in the preferred embodiment of the present invention; such as is capable of transforming shift control signals, such as arise from instruction translation, into signals controlling selection of data input to, and the shift count within, a sixteen bit shift matrix during double precision shifting.

FIG. 7, wherein further circuitry is added to the control of but a single selector, is similarly for the illustration of expanded principles of the present design. FIG. 7 shows the addition of logical OR gating elements 50, 51, 52, 70 and 71 to the circuit of FIG. 5. Two additional control signals, reflective of an expanded and more complex instruction translation or command control, are also output from SHIFT CONTROL 10b in FIG. 7 than were output from SHIFT CONTROL 10a in FIG. 5. One of these signals, SHIFT COUNT BIT 5 on line 16 simply reflects the most significant bit of the instruction or command derived, right or left, shift count. Obviously the six total bits of shift count—signal SHIFT COUNT BIT 0 on line 11 through signal SHIFT COUNT BIT 4 on line 15 plus signal SHIFT COUNT BIT 5 on line 16—provide for shifting zero through sixty-three bit positions. SHIFT COUNT BIT 5 line 16 is respectively logically ORed with signal SELECT FILL SINGLE PRECISION on line 42, signal SELECT FILL DOUBLE SECOND on line 43, and signal SELECT FILL DOUBLE FIRST on line 44, in logical OR elements 50, 51 and 52 respectively.

This process can simply be thought of as overriding the selected (addressed) fill signals output from SHIFT MATRIX CONTROL READ ONLY MEMORY 30c whenever a shift count of thirty-two or greater is indicated, thereby causing, in the operation of SELECT FILL MULTIPLEXOR 60, that signal PRESELECTOR CONTROL BIT 1 on line 72 should be a logical High (indicating fill) unless signal CIRCULAR/FILL on line 18 is a logical High (indicating circular shifting is selected).

The FIG. 7 circuitry in OR elements 50, 51 and 52 which expand the controllable shift count above thirty-one bit positions is not essential to be the core invention of a shift matrix preselector control circuit. Such additional circuitry shows a routineer in the art that once the initial concept—utilizing high level shift control signals not to address a shift matrix control read only memory but rather to selectively gate the encoded output of such a shift matrix control read only memory—is known, then additional embellishments, expansions, and improvements are possible.

Similarly, and continuing in FIG. 7 the new signal FORCE PRESELECTOR CONTROL on line 21 output from SHIFT CONTROL 10b represents the expanded capability of a sophisticated shift control source to override all normal preselection and cause a special fixed quantity, designated as Set Data, to be selected as input to the shift matrix. For example, if this Set Data was a sixteen bit word with some bit or bits set to 1 and some cleared to 0, then the resultant selection as an input to the shift matrix and subsequent controllable shifting would result in a custom data mask arising from a single shift operation. This preselection override is accomplished in logical OR elements 70 and 71 wherein a logical High on signal FORCE PRESELECTOR CONTROL on line 21 will cause signal PRESELECTOR CONTROL BIT 1 on line 72 and signal PRESELECTOR CONTROL BIT 0 on line 73 to be a logical High. These two logically High signals are decoded by PRESELECTOR DECODE 80 into the signal GATE SET DATA on line 84 which, when held in SHIFT MATRIX CONTROL REGISTER 90, will cause a one-of-four selector (shown in FIG. 1) to gate a preset data quantity to the shift matrix (shown in FIG. 1).

A routineer in the art will grasp that the generalized principle of FIG. 7 is that once a shift matrix control read only memory is encoded and muliplexor logic elements efficiently employed in translation of such an encoded output, then a new opportunity for expanded and/or special control arises. A balance need be struck between the design and layout simplicity as monolithic very large scale integrated circuitry of a read only memory for direct control of a shift matrix, and the circuitry and space economics of a design also employing multiplexor and OR gate logical elements. FIG. 7 shows that a design incorporating these multiplexor and OR gate elements, such as is represented by the present shift matrix preselector control circuit, also accords expanded and/or special control opportunities as well as economy of circuitry.

FIG. 8 represents the preferred embodiment of the present invention which is capable of full and generalized control of double precision shifting in a sixteen bit shift matrix, including, most particularly, the control circuit that provides the preselector output control signals which ultimately selectively effectuate gating to the shift matrix. The SHIFT CONTROL 10b is the source of signals SHIFT COUNT BIT 0 on line 11 through SHIFT COUNT BIT 4 on line 15, signal SHIFT COUNT BIT 5 on line 16, plus such other shift control signals as would normally arise from the translation of a shift instruction or receipt of a shift command. The SHIFT MATRIX CONTROL READ ONLY MEMORY 30d is addressed, in least significant input bit 0 through most significant input bit 5 positions, by signal SHIFT COUNT BIT 0 on line 11 through signal SHIFT COUNT BIT 4 on line 15 plus signal LEFT/-RIGHT SHIFT on line 17, respectively. The sixty-four read only memory addressable locations so addressed contain sixteen bits each and are listed in FIG. 6. Signals FINAL SHIFT COUNT BIT 0 on line 31 through FINAL SHIFT COUNT BIT 3 on line 34 are as output bits zero through three, respectively, from SHIFT MATRIX CONTROL READ ONLY MEMORY 30d directly to SHIFT MATRIX CONTROL REGISTER 90 wherein they are held to effect shift control of zero through fifteen bit positions in a sixteen bit shift matrix (shown in FIG. 1).

Continuing in FIG. 8, the remaining output bits four through fifteen of SHIFT MATRIX CONTROL READ ONLY MEMORY 30d are encoded for control of both register select and fill operations as transpire at upper and lower selectors (shown in FIG. 1) to the shift matrix (shown in FIG. 1) at the times of single precision shifting, first pass of a double precision shift, and second pass of a double precision shift.

The two operations (select and fill) times the two selectors controlled (upper and lower) times the three control times (single precision, double precision first pass, and double precision second pass) gives the twelve total selection control bits which will be encoded in SHIFT MATRIX CONTROL READ ONLY MEMORY 30d. These twelve encoded bits that enable operation of further shift matrix preselector control circuitry are partitioned and distributed as follows. One group of six bits—SHIFT MATRIX CONTROL READ ONLY MEMORY 30d bits 4 through 9—is for development of one group of preselector control signals on lines 72a and 73a which will control one selector (shown in FIG. 1), both preselector and selector being designated "lower." The remaining six bits—SHIFT MATRIX CONTROL READ ONLY MEMORY 30d bits 10 through 15—are for development of the other group of preselector control signals on lines 72b and 73b controlling the other selector (shown in FIG. 1), both preselector and selector being designated "upper." The shift matrix preselector control circuitry utilizing each of these two sets of six signals is implemented in the same way. Of course, the two parallel preselector control circuits will not generally deliver the same output signals at the same time, as may be observed by comparing bits four through nine and bits ten through fifteen in each addressable location of SHIFT MATRIX CONTROL READ ONLY MEMORY 30d as contained in FIG. 6. In FIG. 8 the lower preselector control circuit is identified by a small letter "a" appending the numbered designation whereas the upper preselector control circuit is identified by the small letter "b" appending the numbered designation. The following description of the lower preselector control circuit indicates in the parenthesized inclusions the equivalence between the lower "a" and upper "b" preselector control circuits.

Continuing in FIG. 8, the six signals encoded for preselector control are divided into three concerning register selection—SELECT LOWER (UPPER) SINGLE PRECISION on line 39a(b), SELECT LOWER (UPPER) DOUBLE SECOND on line 40a(b), and SELECT LOWER (UPPER) DOUBLE FIRST on line 41a(b)—and three concerning selection of a fill input to shift matrix—SELECT FILL LOWER (UP- PER) SINGLE PRECISION on line 42a(b), SELECT FILL LOWER (UPPER) DOUBLE SECOND on line 43a(b), and SELECT FILL LOWER (UPPER) DOUBLE FIRST on line 44a(b).

The designations of "SINGLE PRECISION", "DOUBLE SECOND", and "DOUBLE FIRST" in the names of signals in both the register selection and fill groups represent the respective operations of single precision shifting, double precision shifting second pass, and double precision shifting first pass at which respective times the appropriate signals will be gated as lower (upper) preselector control on lines 72a(b) and 73a(b). Those register selection and fill selection signals themselves, representative only of the associated encoding of SHIFT MATRIX CONTROL READ ONLY MEMORY 30d bits four through nine (ten through fifteen), do not so determine such respective times. In actual fact, they will be controllably gated by multiplexor elements at such times as a single precision, double precision first pass, or double precision second pass shift sequence is to be performed. A logical Low or 0 for any of the three register select signals on lines 39a(b), 40a(b), or 41a(b) means that sixteen bit register one (R1) is to be gated to the sixteen bit shift matrix. A logical High, or 1 for any of the three register select signals on lines 39a(b), 40a(b) or 41a(b) means that sixteen bit register two (R2) should be gated to the sixteen bit shift matrix. A logical Low, or 0 for any of the three select fill signals on lines 42a(b), 43a(b) or 44a(b) means that a fill should not be gated to the shift matrix, while a logical High, or 1, means that a fill quantity should be gated to the shift matrix.

Continuing in FIG. 8, the three select fill signals—SELECT FILL LOWER (UPPER) SINGLE PRECISION on line 42a(b), SELECT FILL LOWER (UPPER) DOUBLE SECOND on line 43a(b), and SELECT FILL LOWER (UPPER) DOUBLE FIRST on line 44a(b)—are logically ORed with signal SHIFT COUNT BIT 5 on line 16 in respective logical OR elements 50a(b), 51a(b), and 52a(b). A logical High for signal SHIFT COUNT BIT 5 on line 16, originating directly at SHIFT CONTROL 10b, thereby serves as a substitutionary override for the normal select fill programming of SHIFT MATRIX CONTROL READ ONLY MEMORY 30d as is present on lines 42a(b), 43a(b), and 44a(b). Such an override will cause a fill signal to be output on lines 53a(b), 54a(b), and 55a(b) whenever the shift count equals or exceeds thirty-two bit positions. Normally, however, signal SELECT FILL LOWER (UPPER) SINGLE PRECISION on line 42a(b) will be transmitted to SELECT FILL LOWER (UPPER) MULTIPLEXOR 60a(b) as both the zero and one data inputs.

Similarly, signal SELECT FILL LOWER (UPPER) DOUBLE SECOND on line 43a(b) is connected through OR element 51a(b) and line 54a(b) to data input two of SELECT FILL LOWER (UPPER) MULTIPLEXOR 60a(b) while signal SELECT FILL LOWER (UPPER) DOUBLE FIRST on line 44a(b) is connected through OR element 52a(b) and line 55a(b) as the third and final data input to SELECT FILL LOWER (UPPER) MULTIPLEXOR 60a(b).

Continuing in FIG. 8, the enablement signal to SELECT FILL LOWER (UPPER) MULTIPLEXOR 60a(b), which is required to be a logical Low to enable selection by the multiplexor, is signal CIRCULAR/FILL on line 19 which is a logical High when circular fill is directed. When signal CIRCULAR/FILL on line 19 is a logical High, meaning that a circular fill is directed, then output signal line 62a of SELECT FILL LOWER (UPPER) MULTIPLEXOR 60a will be a logical Low, which will be later seen to mean that a sign fill will not transpire. When signal CIRCULAR/FILL on line 19 is a logical Low, meaning that circular fill is not directed, then one of the four data inputs to SELECT FILL LOWER (UPPER) MULTIPLEXOR 60a(b) will be selected by combination the most significant, SEL 1, selector input of signal SINGLE/DOUBLE PRECISION on line 20, and the least significant, SEL 0, selector input of signal FIRST/SECOND PASS on line 19. Signal SINGLE/DOUBLE PRECISION on line 20 is a logical Low for single precision shifting and will consequently cause SELECT FILL LOWER (UPPER) MULTIPLEXOR 60a(b) to uniquely gate the signal on line 53a(b), nominally signal SELECT FILL LOWER (UPPER) SINGLE PRECISION on line 42a(b). Alternatively, when signal SINGLE/DOUBLE PRECISION on line 20 is a logical High, indicating double precision shifting, then signal FIRST/SECOND PASS on line 19, which is firstly a logical High for a first pass during double precision shifting and secondly a logical Low for a second pass, will cause SELECT FILL LOWER (UPPER) MULTIPLEXOR 60a(b) to first and secondly gate signals on lines 55a(b) and 54a(b) during the two controlled sequences, as originate at SHIFT CONTROL 10b, of a double precision shift operation. Generally, the operation of SELECT FILL LOWER (UPPER) MULTIPLEXOR 60a(b) is thereby seen to utilize three control signals originating at high level SHIFT CONTROL 10b to select amongst three encoded signals originating from the addressed location of SHIFT MATRIX CONTROL READ ONLY MEMORY 30d in order to uniquely select a control signal on line 62a(b) as will indicate fill or no fill during single precision, double precision first pass, and double precision second pass shift sequences.

Continuing in FIG. 8, the operation of REGISTER SELECT LOWER (UPPER) MULTIPLEXOR 61a(b) similarly develops the control signal on line 63a(b) which will be involved in the selection of register inputs to the shift matrix. It should be firstly noted that the enablement signal input to REGISTER SELECT LOWER (UPPER) MULTIPLEXOR 61a(b), which must be a logical Low to enable multiplex selection, is the output signal on line 62a(b) from SELECT FILL LOWER (UPPER) MULTIPLEXOR 60a(b). Thus a register select output signal on line 63a from REGISTER SELECT LOWER (UPPER) MULTIPLEXOR 62a(b) cannot be a logical High unless the signal on line 62a(b) is a logical Low, meaning that a fill input is not to be gated to the shift matrix. Conversely, if a fill is enable via a logical High signal on line 62a(b) then REGISTER SELECT LOWER (UPPER) MULTIPLEXOR 61a(b) can only output a logical Low as the signal on line 63a(b). This relationship will later be seen to support a decoding of the fill and select signals on line 62a(b) and line 63a(b) respectively, into the selector control signals as are necessary for generalized control of double precision shifting.

Continuing in FIG. 8, least significant data input 0 to REGISTER SELECT LOWER (UPPER) MULTIPLEXOR 61a(b) is the signal SELECT LOWER (UPPER) SINGLE PRECISION on line 39a(b). Data input 1 is hardwired to a logical High, or 1. Data input 2 is the signal SELECT LOWER (UPPER) DOUBLE SEC- OND on line 40a(b) and data input 3 is the signal SELECT LOWER (UPPER) DOUBLE FIRST on line 41a(b). Selection amongst these four input signals is controlled by the same two select signals in the same relationship as were previously used to select SELECT FILL LOWER (UPPER) MULTIPLEXOR 60a(b). Namely, SINGLE/DOUBLE PRECISION on line 20 is the most significant, SEL 1, select input and signal FIRST/SECOND PASS on line 19 is the least significant, SEL 0, select input. As in operation of SELECT FILL LOWER (UPPER) MULTIPLEXOR 60a(b), these select signals again operate to select a single input signal from amongst the four input signals which correspond to the particular type of shift sequence being performed. Signal FIRST/SECOND PASS on line 20 is a logical High for a first pass and a logical Low for a second pass of double precision shifting. Note therefore, for example, that the generally illogical and unused shift control conditions of single precision shifting second pass would gate the logical High signal hardwired to input 1 of REGISTER SELECT LOWER (UPPER) MULTIPLEXOR 61a(b).

This shift control condition is, however, translatable into an actual register 2—and shows, along with the OR gating elements in FIG. 8—yet another manner in which the shift matrix preselector control circuit of the present invention may be responsively adapted to particular and special shift control conditions such as arise at SHIFT CONTROL 10b. Generally, the operation of REGISTER SELECT LOWER (UPPER) MULTIPLEXOR 61a(b) is to gate as the appropriate control signal on line 63a(b) that signal which will indicate register selection during single precision, double precision first pass, and double precision second pass shift sequences.

Continuing in FIG. 8, logical OR elements 70a(b) and 71a(b) present the opportunity for a single signal, a logical High signal FORCE PRESELECTOR CONTROL on line 21 originating at SHIFT CONTROL 10b, to force, regardless of other conditions, singals LOWER (UPPER) PRESELECTOR CONTROL BIT 0 on line 73a(b) and LOWER (UPPER) PRESELECTOR CONTROL BIT 1 on line 72a(b) to a logical High condition. Recalling the interaction of SELECT FILL LOWER (UPPER) MULTIPLEXOR 60a(b) output signal on line 62a(b) with the enablement of REGISTER SELECT LOWER (UPPER) MULTIPLEXOR 61a(b), this forced preselector control is the only way in which both preselector control signals could simultaneously be a logical High. As will shortly be seen, this condition forced by a logical High signal FORCE PRESELECTOR CONTROL on line 21 will have an unique selection function, although such an expanded capability is not necessary to generalized control of selection to a shift matrix in performance of double precision shifting. The feature of logical OR elements 70a(b) and 71a(b) is shown so that it may be recognized that the fundamental invention of shift matrix preselector control via encoded ROM and multiplexor means is not altered by the mere logical inclusion of other, further control signals such as effect preselection, selection and/or shift count.

Continuing in FIG. 8, the two preselection control signals LOWER (UPPER) PRESELECTOR CONTROL BIT 0 on line 73a(b) and LOWER (UPPER) PRESELECTOR CONTROL BIT 1 on line 72a(b) are decoded as the least significant signal input and most significant signal input, respectively, to LOWER (UPPER) PRESELECTOR DECODE 80a(b). The decode of the two preselector control signals, as is routinely accomplished in simple AND gate circuitry, results in four signal outputs, the select signals on lines 81a(b) through 84a(b).

The signal decoded in LOWER (UPPER) PRESELECTOR DECODE 80a(b) from a logical Low on both input signal LOWER (UPPER) PRESELECTOR CONTROL BIT 0 on line 73a(b) and LOWER (UPPER) PRESELECTOR CONTROL BIT 1 on line 72a(b) is LS (US) GATE R1 on line 81a(b), which simply means that the lower (upper) selectors will gate register one to the shift matrix. Similarly, when only input signal LOWER (UPPER) PRESELECTOR CONTROL BIT 0 on line 73a(b) is a logical High, then the LOWER (UPPER) PRESELECTOR DECODE 80a(b) will generate output signal LS (US) GATE R2 on line 82a(b). Correspondingly, the signals directing the selectors to gate data as opposed to registers are LS (US) GATE FILL on line 83a(b) and LS (US) GATE SET DATA on line 84a(b), which are developed only when signal LOWER (UPPER) PRESELECTOR CONTROL BIT 1 on line 72a(b) is a logical High. The decode of the preselector control lines shows why signal LOWER (UPPER) PRESELECTOR CONTROL BIT 1 on line 72a(b) and associated circuitry is associated with gating sign fill input to the shift matrix, whereas signal LOWER (UPPER) PRESELECTOR CONTROL BIT 0 on line 73a(b) is associated with selection of register data to be input to the shift matrix. These register and sign fill data sources, the upper and lower selectors, and the shift matrix are shown in FIG. 1.

Finally in FIG. 8, SHIFT MATRIX CONTROL REGISTER 90 is simply a control site wherein all the signals controlling each of two, upper and lower, selectors (shown in FIG. 1) plus the shift count may be held in order to effectuate control of the shift matrix (shown in FIG. 1) during each sequence of a shift operation. SHIFT MATRIX CONTROL REGISTER 90 is somewhat arbitrary, and need not physically exist between the actual control signals and the controlled shift matrix if the timing of SHIFT CONTROL 10a in comparison to the loading of data sources (such as registers) feeding the shift matrix, and data extraction from the shift matrix output, otherwise permits of direct, unbuffered, control. Normally, and with the present invention of a SHIFT MATRIX PRESELECTOR CONTROL CIRCUIT implemented in monolithic cascaded logic integrated circuitry, SHIFT MATRIX CONTROL REGISTER 90 will exist. It represents the terminus of the present invention whereby high-level shift control signals have been transformed in SHIFT MATRIX PRESELECTOR CONTROL CIRCUITRY into such low-level control signals as permit generalized selection of inputs to a shift matrix in the performance of double precision shifting.

What is claimed is:

1. In a digital system that translates a first plurality of high-level shift control signals, which typically arise from instruction translation, which first plurality of signals is used in portions designated first portion, second portion, third portion, and fourth portion, into a second plurality of low-level shift process control signals, which control the selective gating of data to a shift matrix and the shifting of data within said shift matrix, an improvement in the method of translation comprising:

addressing a memory, using the first plurality-first portion signals, to cause said memory to output a third plurality of shift control signals having a first portion and a second portion; then inputting the third plurality-first portion signals, from said memory, to a plurality of multiplexors; then using the first plurality-second portion signals to control signal selection in said plurality of multiplexors; then outputting, from said plurality of multiplexors, a fourth plurality of shift control signals, selected from the inputted signals; then decoding in a decoder circuit said fourth plurality of shift control signals into a fifth plurality of shift control signals, wherein said fifth plurality of shift control signals plus said second portion of said third plurality of shift control signals are, collectively, identical to said second plurality of shift process control signals.

2. The method of translation in claim 1 wherein said method of translation further comprises between said addressing and said selecting steps:

substituting in first OR gates a received said third portion of said first plurality of shift control signals for at least some of said first portion of said third plurality of shift control signals.

3. The method of translation in claim 2 wherein said method of translation further comprises between said selecting and said decoding steps:

substituting in second OR gates said fourth portion of said first plurality of shift control signals for at least some of said fourth plurality of shift control signals.

4. The method of translation in claim 1 wherein said selecting step further comprises:

conditionally IF one binary state of a received single one of the signals of said second portion of said first plurality of shift control signals exists, THEN enabling selecting in a first multiplexor, responsively to multiplexed selection control by a received separate two signals of said second portion of said first plurality of shift control signals, from amongst a received first group of said first portion of said third plurality of shift control signals a single first signal, ELSE IF the other binary state of said single one of the signals of said second portion of said first plurality of shift control signals exists, THEN disabling selecting said first multiplexor causing said single first signal to assume a logical false or zero condition; and also conditionally IF said one binary state of said received single one of said signals of said second portion of said first plurality of shift control signals exists, THEN enabling selecting in a second multiplexor, also responsively to multiplexed selection control by a received said two signals of said second portion of said first plurality of shift control signals, from amongst a received second group of said first portion of said third plurality of shift control signals a single second signal, ELSE IF the other binary state of said single one of the signals of said second portion of said first plurality of shift control signals exists, THEN disabling selecting said second multiplexor causing said single second signal to assume a logical false or zero condition; then conditionally IF a received said selected single first signal is false, enabling selecting in a third multiplexor, responsively to multiplexed selection control by a received said two signals of said second portion of said first plurality of shift control signals, from amongst a received third group of said first portion of said third plurality of shift control signals a single third signal, ELSE IF said selected single second signal is true or one, THEN disabling selecting said third multiplexor causing said single third signal to assume a logical false or zero condition; and conditionally IF a received said selected single second signal is false, enabling selecting in a fourth multiplexor, responsively to multiplexed selection control by a received said two signals of said second portion of said first plurality of shift control signals, from amongst a received fourth group of said first portion of said third plurality of shift control signals a single fourth signal, ELSE IF said selected single second signal is true or one, THEN disabling selecting said forth multiplexor causing said single fourth signal to assume a logical false or zero condition;

wherein said single first signal, said single second signal, said single third signal, and said single fourth signal collectively form said selected fourth plurality of shift control signals.

5. The selecting step of claim 4 wherein named signals are further defined as:

said single one of the signals of said second portion of said first plurality of shift control signals represents enablement of circular fill;

said two signals of said second portion of said first plurality of shift control signals represent in a first signal whether single or double precision shifting is to be performed and represent in a second signal whether first or second pass is to be performed;

the signals of said first group and of said second group of said third plurality of shift control signals each represent enabling gating of a sign fill input quantity to said shift matrix; and the signals of said third group and of said fourth group of said third plurality of shift control signals each represent enabling gating of the contents of a data register to said shift matrix.

6. In a system having a source of a first plurality of shift control signals available in portions, a shift matrix enterable with data, a plurality of sources of shift data, one or more controllable selector means for selectably gating a chosen one of said plurality of sources of shift data to said shift matrix, and selector control means responsive to said first plurality of shift control signals for controlling the selective gating of said selecting means, the improvement wherein said selector control means comprises:

a memory addressed by a first portion of said first plurality of shift control signals and responsively to such addressing outputting a second plurality of shift control signals; and one or more multiplexing and decoding unit means each for controlling one of said selector means wherein each contains a first multiplexor receiving a universally unique first portion of said second plurality of shift control signals, selecting amongst said first portion of said second plurality of shift control signals responsively to multiplexed selection control by a universally same second portion of said first plurality of shift control signals, and being enabled for said selecting by a universally same third portion of said first plurality of shift control signals, and responsively thereto said first portion plus said second portion plus said third portion of said first plurality of shift control signals, outputting a universally unique selected single first signal, a second multiplexor receiving a universally unique second portion of said second plurality of shift control signals, selecting amongst said first portion of said second plurality of shift control signals responsively to multiplexed selection control by said universally same second portion of said first plurality of shift control signals, and being enabled for said selecting by said selected single first signal, and responsively thereto said first portion plus said second portion of said second plurality of shift control signals plus said selected single first outputting a universally unique selected single second signal, and decoder means for receiving said selected single first signal and said selected single second signal, and for jointly decoding both into universally unique signals controlling the selective gating of said one of said selector means; and wherein universally unique means signals unique as between all of said one or more multiplexing and decoding units while universally same means the selfsame identical signals as utilizable at all of said one or more multiplexing and decoding units.

7. The improvement of claim 6 wherein each said one or more multiplexing and decoding units means further comprises:

gating means intermediary between said memory and said first multiplexor for combining in a logically ORed manner a universally same fourth portion of said first plurality of shift control signals with said first portion of said second plurality of shift control signals.

8. The improvement in claim 6 or 7 wherein each said multiplexing and decoding unit means further comprises:

first gating means intermediary between said first multiplexor and said decoder means for substituting in a logically ORed manner a universally same fifth portion of said first plurality of shift control signals for said selected single first signal; and second gating means intermediary between said second multiplexor and said decoder means for substituting in a logically ORed manner said universally same fifth portion of said first plurality of shift control signals for said selected single second signal.

9. In a computer system having a source of a first plurality of shift control signals which are utilizable in portions one through four and proceeding therefrom to developing control signals for controlling a shift matrix for double precision shifting with selectable fill, the circuit apparatus particularly for developing the signals controlling the gating of data and fill quantities through upper and lower selectors to the shift matrix which comprises:

memory means addressed by a first portion of said first plurality of shift control signals for responsively thereto outputting a second plurality of shift control signals;

first multiplexor means for receiving a first portion of said second plurality of shift control signals, for being enabled for multiplexed selection by a single signal second portion of said first plurality of shift control signals, and controlled for selecting by a third portion of said first plurality of shift control signals to output a one of said first portion of said second plurality of shift control signals as a first preselector signal;

second multiplexor means for receiving a second portion of said second plurality of shift control signals, for being enabled for multiplexed selection by said first preselector signal, and controlled for selecting by said third portion of said second plurality of shift control signals to output a one of said second portion of said second plurality of shift control signals as a second preselector signal;

third multiplexor means for receiving a third portion of said second plurality of shift control signals, for being enabled for multiplexed selection by said single signal second portion of said first plurality of shift control signals, and controlled for selecting by said third portion of said first plurality of shift control signals to output a one of said third portion of said second plurality of shift control signals as a third preselector control signal;

fourth multiplexor means for receiving a fourth portion of said second plurality of shift control signals, for being enabled for multiplexed selection by said third preselector control signal, and controlled for selecting by said third portion of said first plurality of shift control signals to output a one of said fourth portion of said second plurality of shift control signals as a fourth preselector signal;

first decoder means for translating said first preselector signal and said second preselector signal into said signals controlling said upper selector to said shift matrix; and second decoder means for translating said third preselector signal and said fourth preselector signal into said signals controlling said lower selector to said shift matrix.

* * * * *